Figure 1:
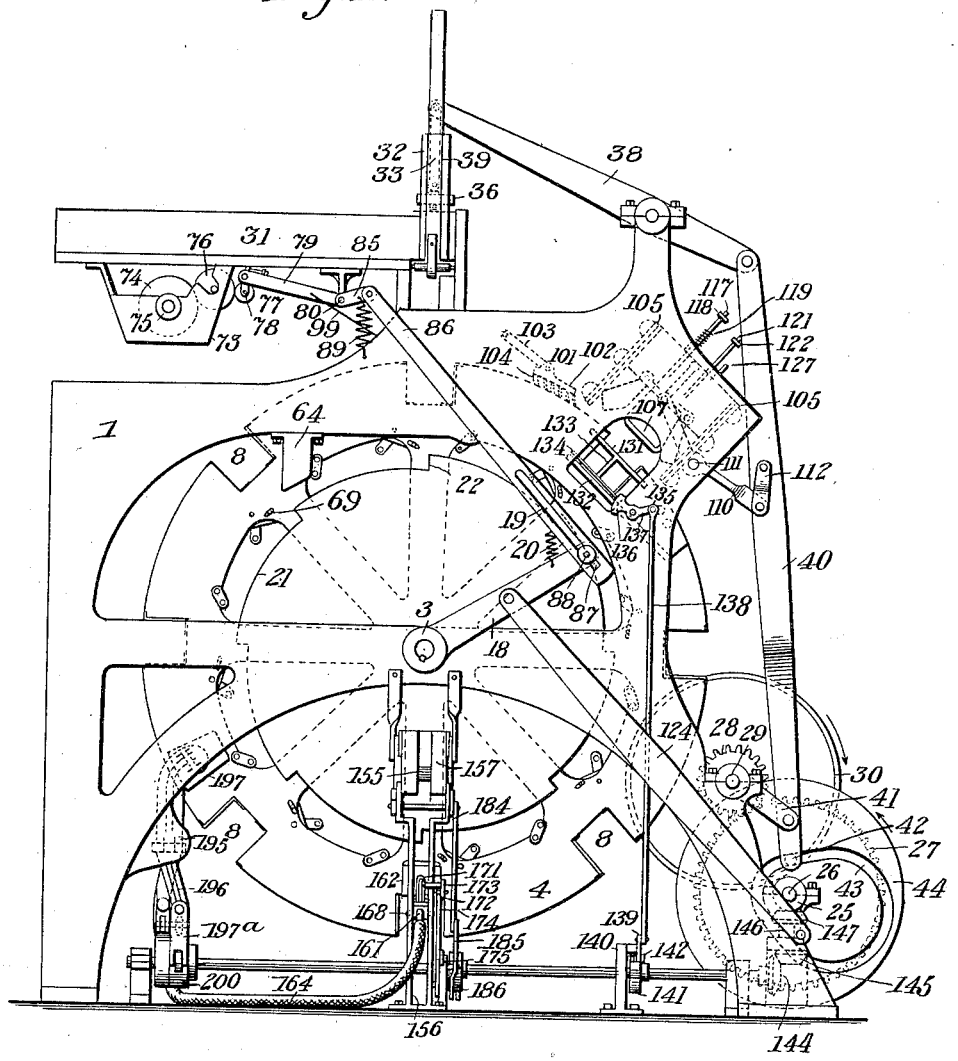

No. 672,286. Patented Apr. 16, 1901.
F. M. PETERS & H. H. HUNGERFORD.
MACHINE FOR WRAPPING AND LABELING PACKAGES.
(Application filed Oct. 27, 1899.)
(No Model.) 17 Sheets—Sheet 1.

Witnesses.
Inventors.
Frank M. Peters
Henry H. Hungerford

No. 672,286. Patented Apr. 16, 1901.
F. M. PETERS & H. H. HUNGERFORD.
MACHINE FOR WRAPPING AND LABELING PACKAGES.
(Application filed Oct. 27, 1899.)
(No Model.) 17 Sheets—Sheet 2.

No. 672,286. Patented Apr. 16, 1901.
F. M. PETERS & H. H. HUNGERFORD.
MACHINE FOR WRAPPING AND LABELING PACKAGES.
(Application filed Oct. 27, 1899.)
(No Model.) 17 Sheets—Sheet 3.
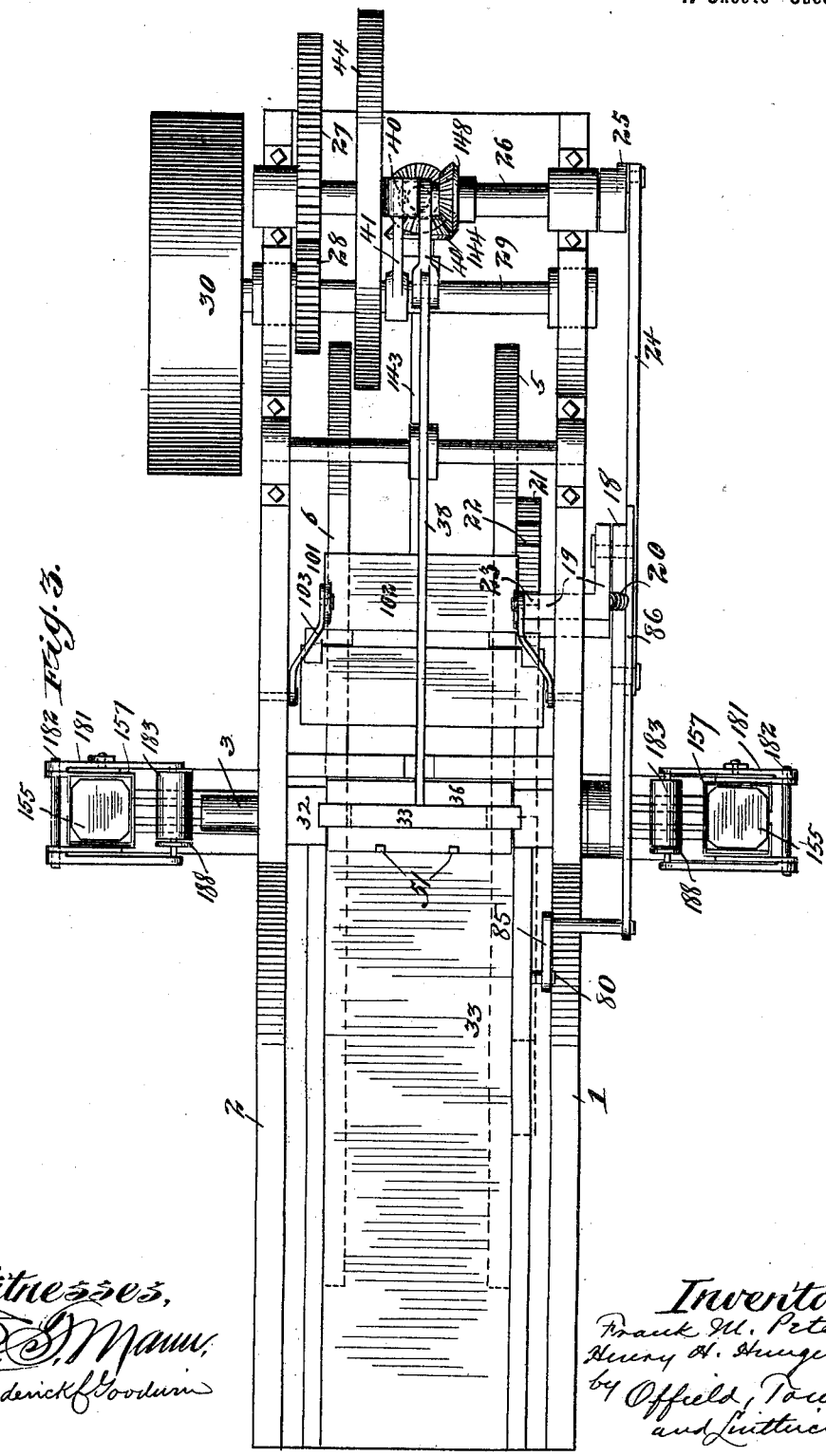

No. 672,286. Patented Apr. 16, 1901.
F. M. PETERS & H. H. HUNGERFORD.
MACHINE FOR WRAPPING AND LABELING PACKAGES.
(Application filed Oct. 27, 1899.)
(No Model.) 17 Sheets—Sheet 4.
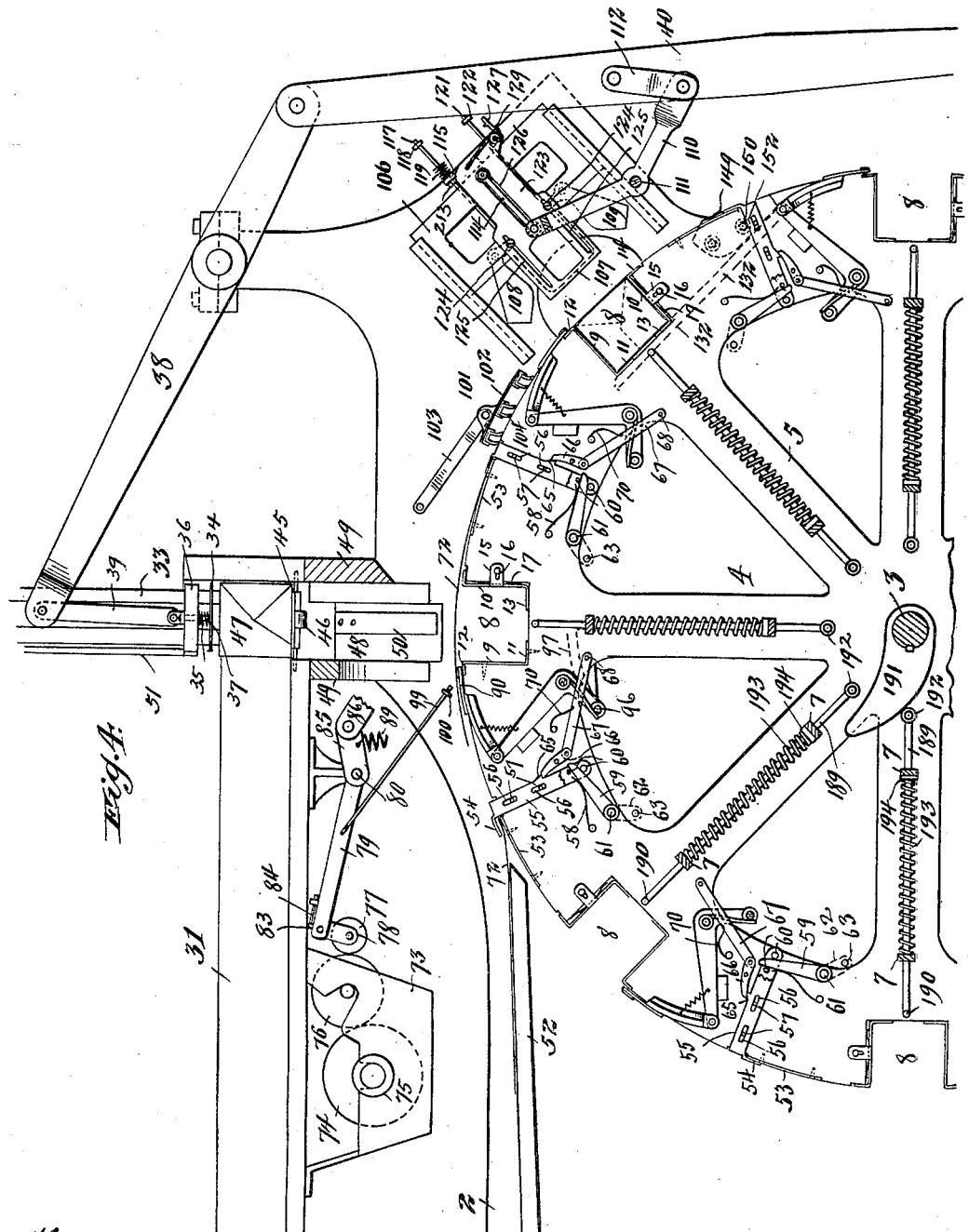

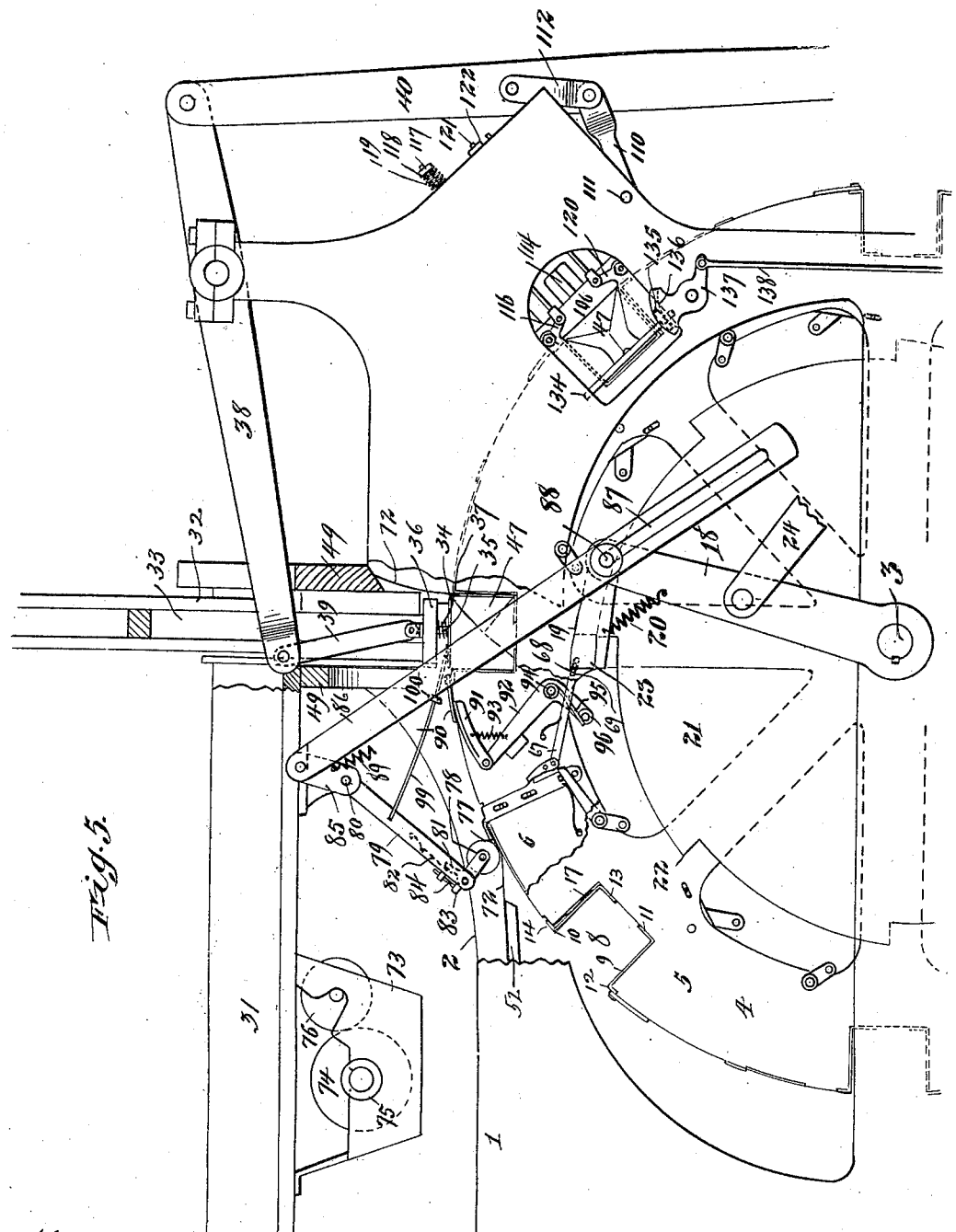

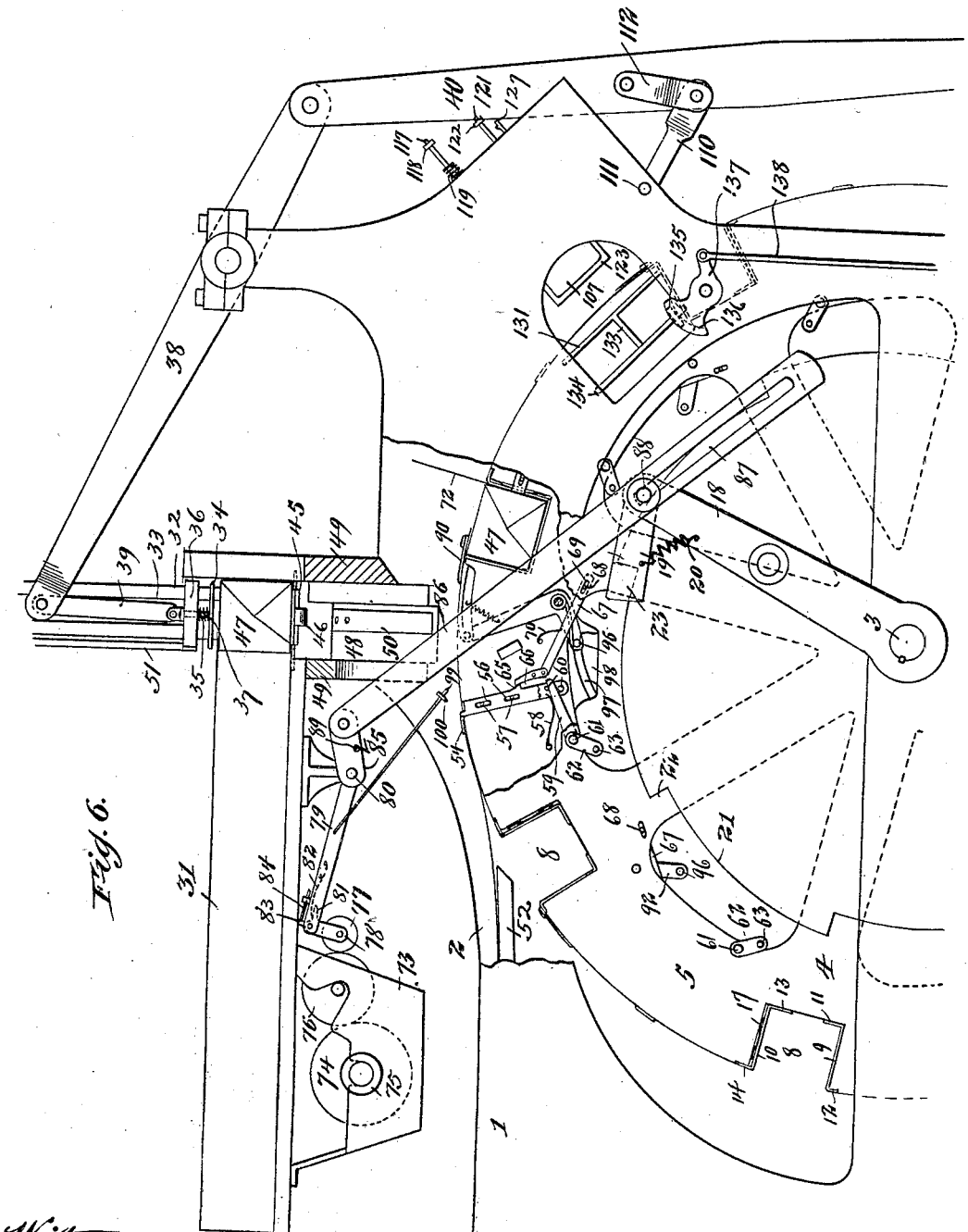

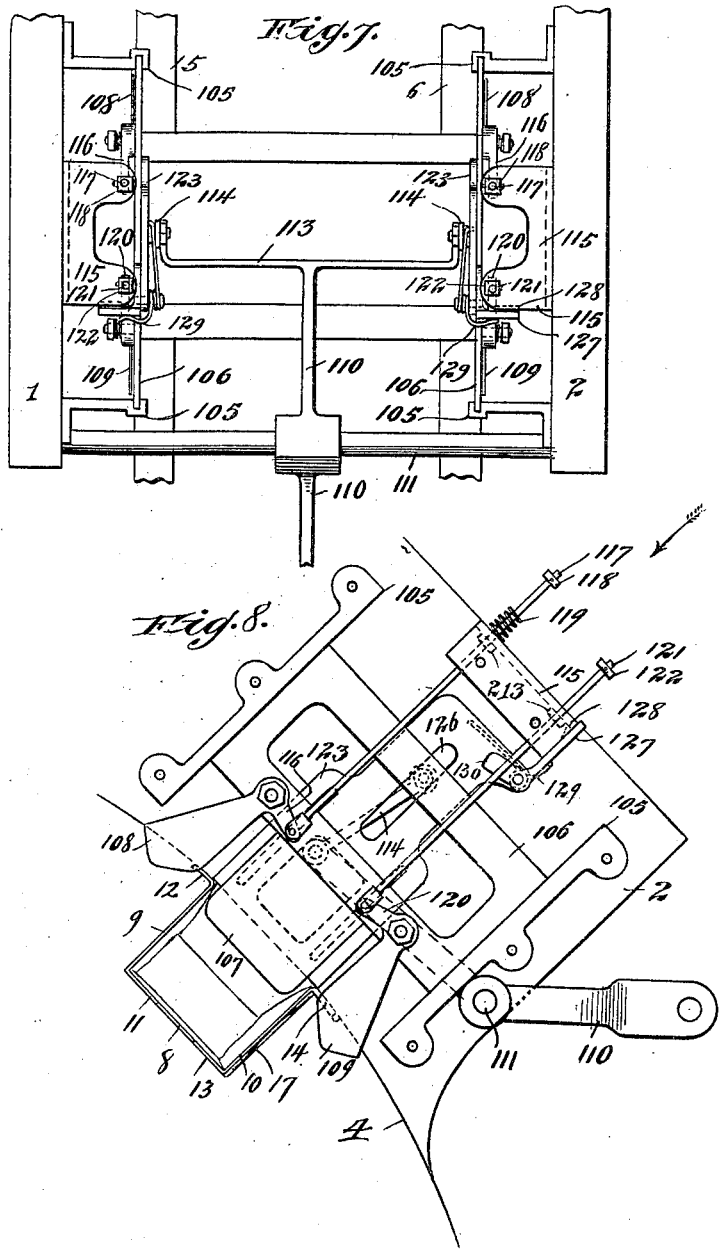

No. 672,286. Patented Apr. 16, 1901.
F. M. PETERS & H. H. HUNGERFORD.
MACHINE FOR WRAPPING AND LABELING PACKAGES.
(Application filed Oct. 27, 1899.)
(No Model.) 17 Sheets—Sheet 8.
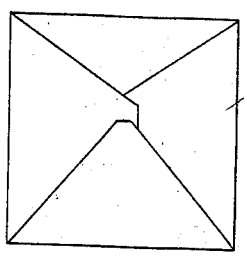
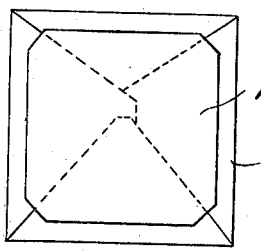
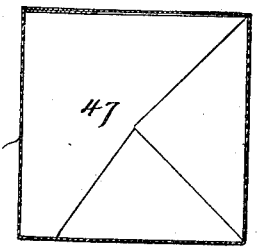
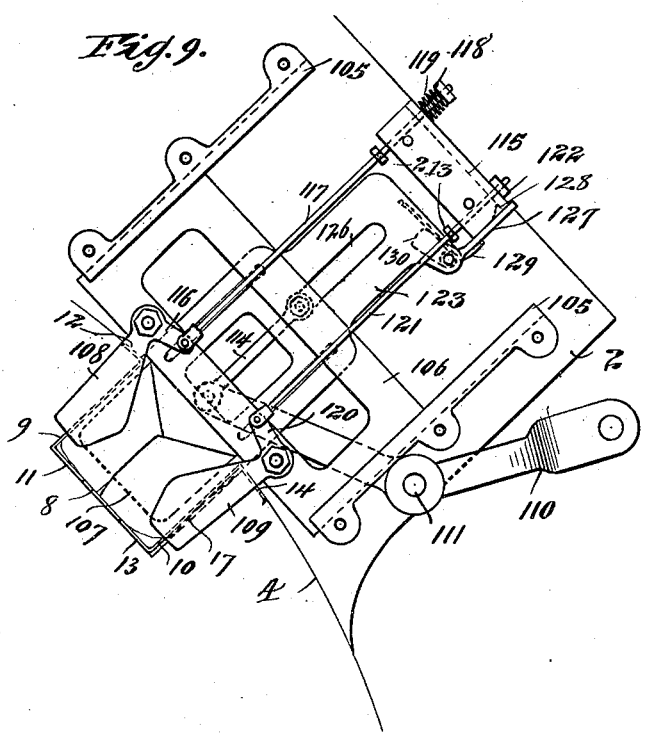

No. 672,286. Patented Apr. 16, 1901.
F. M. PETERS & H. H. HUNGERFORD.
MACHINE FOR WRAPPING AND LABELING PACKAGES.
(Application filed Oct. 27, 1899.)
(No Model.)
17 Sheets—Sheet 9.
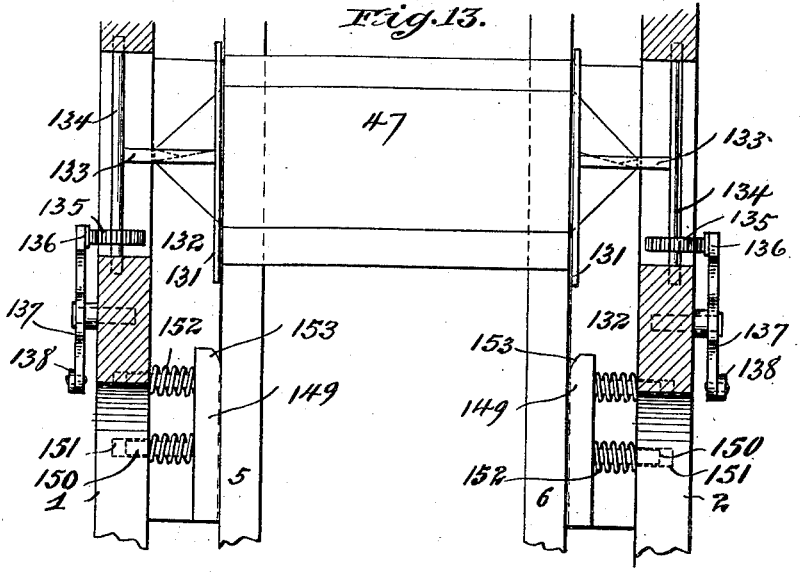
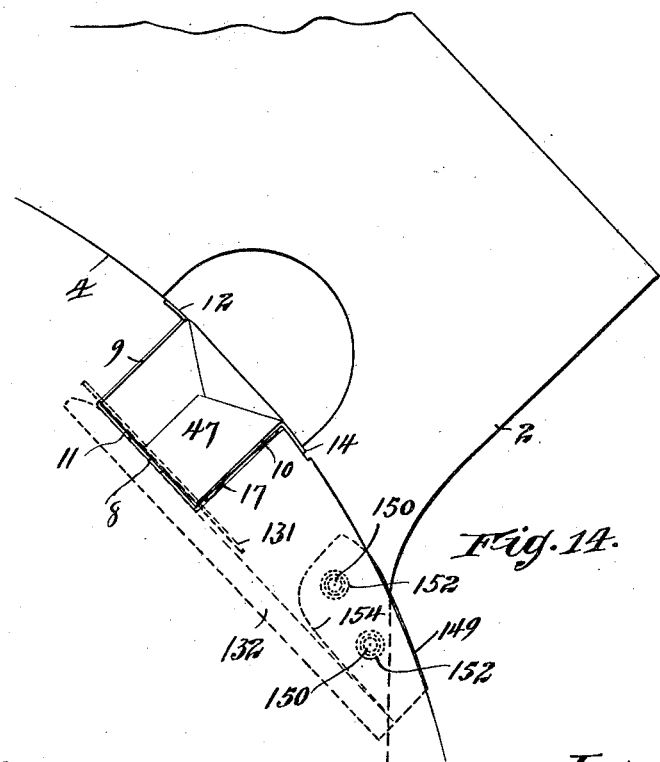

No. 672,286. Patented Apr. 16, 1901.
F. M. PETERS & H. H. HUNGERFORD.
MACHINE FOR WRAPPING AND LABELING PACKAGES.
(Application filed Oct. 27, 1899.)
(No Model.) 17 Sheets—Sheet 10.
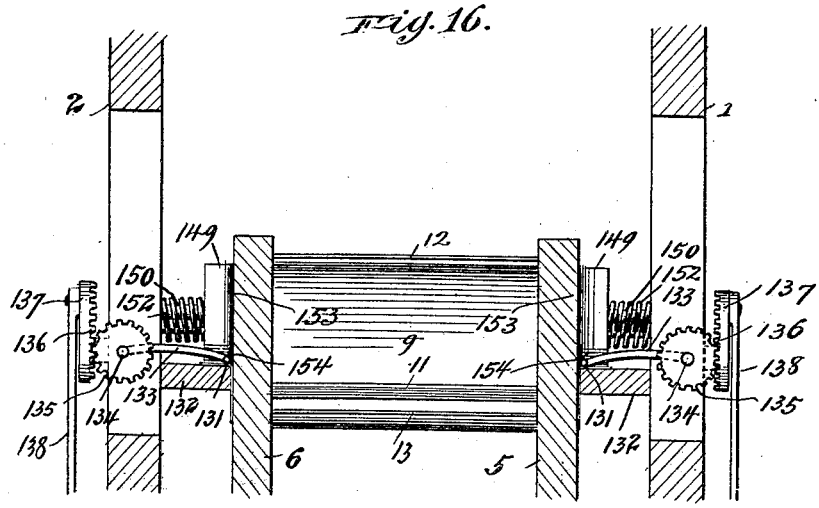
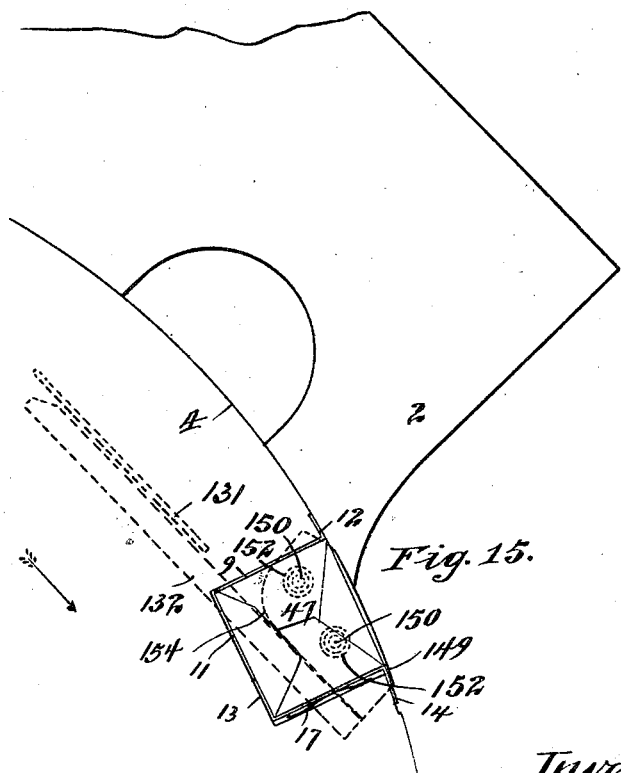
Witnesses, Inventor,
Frank M. Peters,
Henry H. Hungerford
By Offield, Towle & Linthicum
Attys.

No. 672,286.  
Patented Apr. 16, 1901.
F. M. PETERS & H. H. HUNGERFORD.
MACHINE FOR WRAPPING AND LABELING PACKAGES.
(Application filed Oct. 27, 1899.)
(No Model.)  
17 Sheets—Sheet 11.
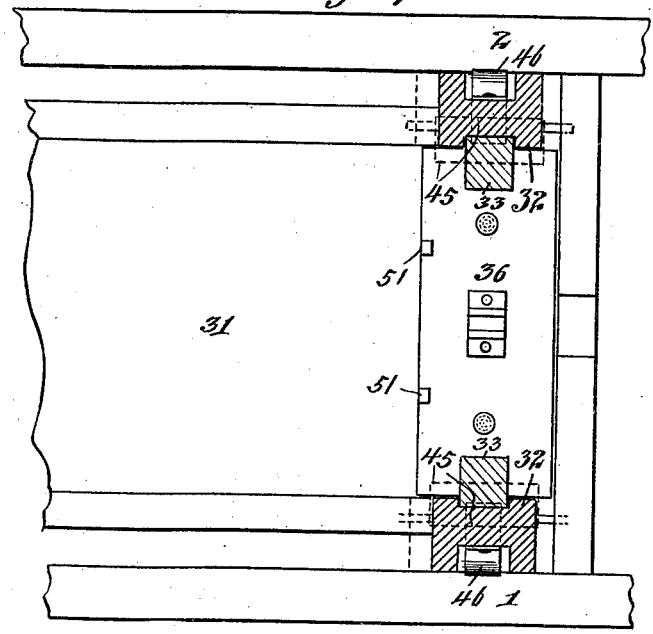
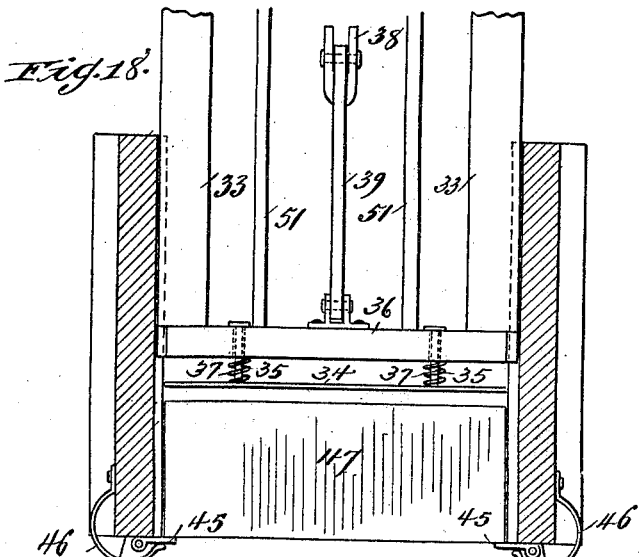
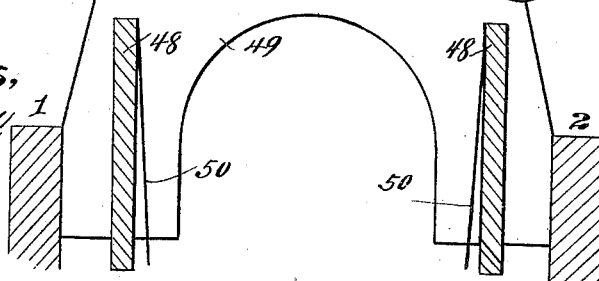

No. 672,286. Patented Apr. 16, 1901.
F. M. PETERS & H. H. HUNGERFORD.
MACHINE FOR WRAPPING AND LABELING PACKAGES.
(Application filed Oct. 27, 1899.)
(No Model.)
17 Sheets—Sheet 12.
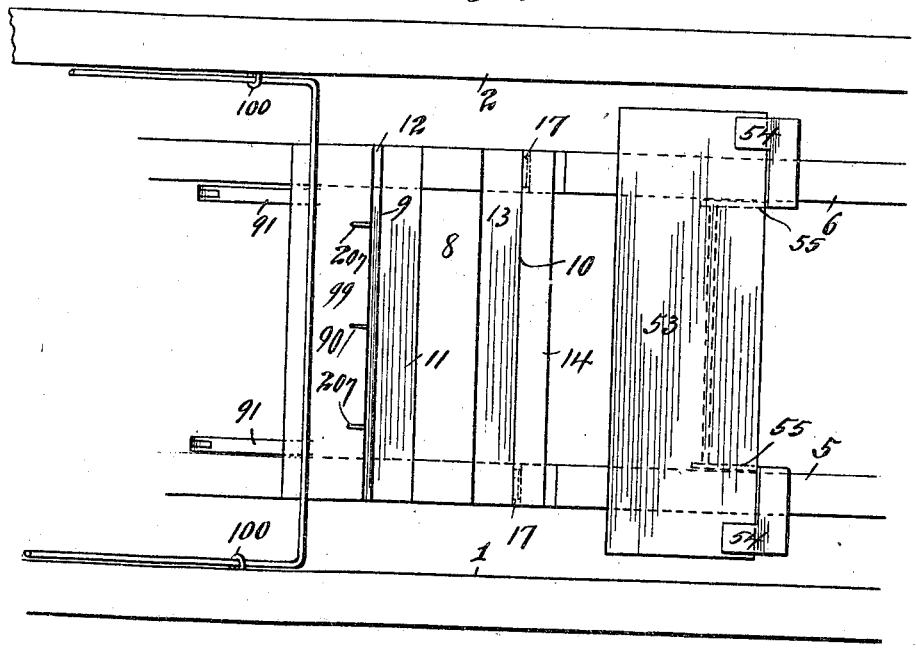
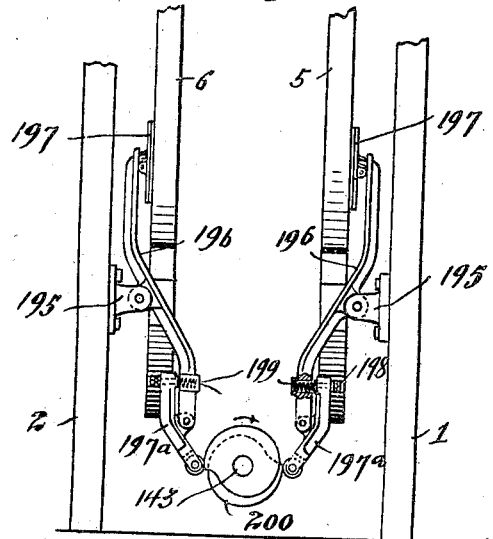

No. 672,286. Patented Apr. 16, 1901.
F. M. PETERS & H. H. HUNGERFORD.
MACHINE FOR WRAPPING AND LABELING PACKAGES.
(Application filed Oct. 27, 1899.)
(No Model.) 17 Sheets—Sheet 13.
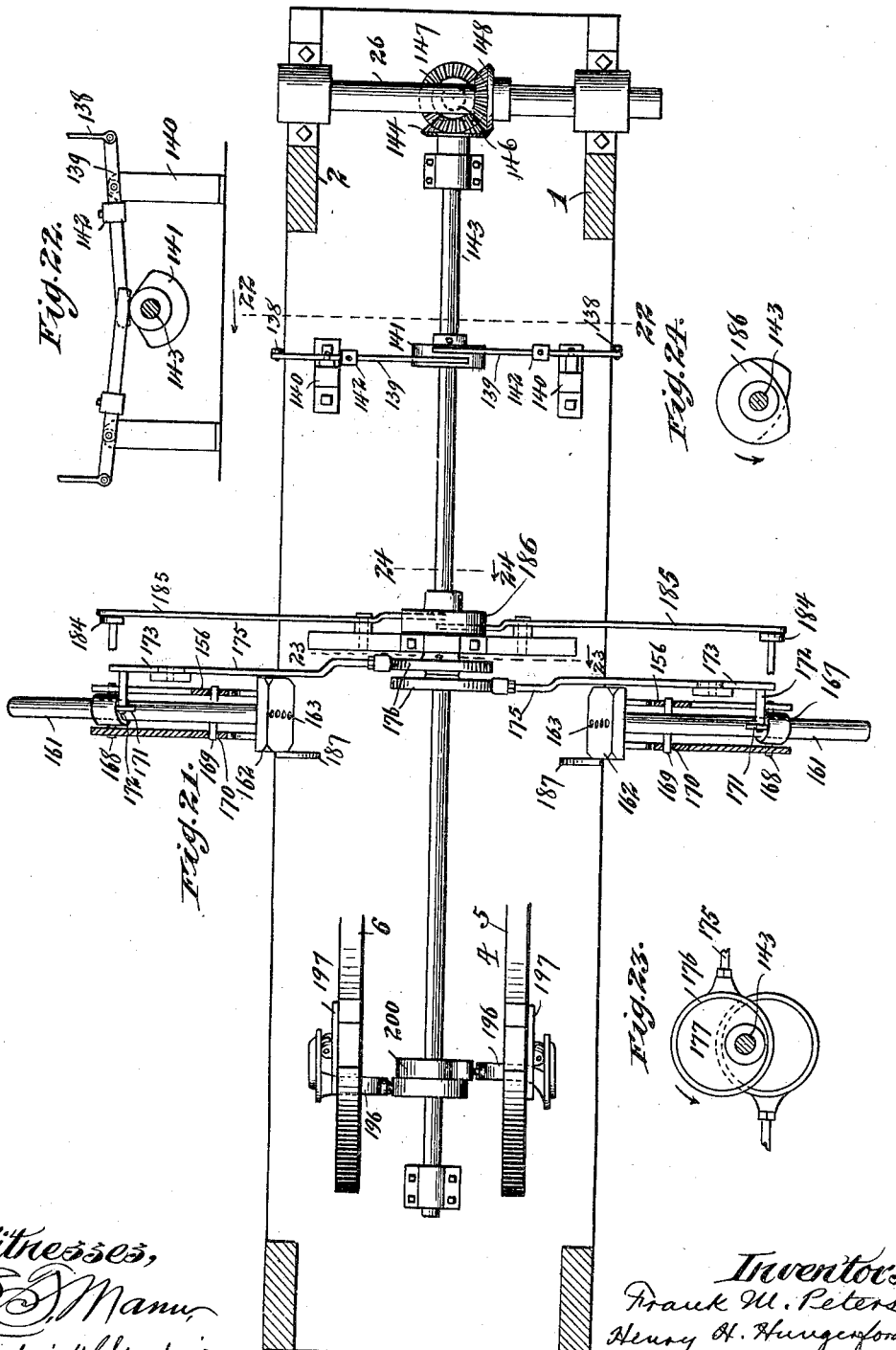
Witnesses,
Inventors,
Frank M. Peters,
Henry H. Hungerford,
By Offield, Towle & Linthicum,
Attys.

No. 672,286.  
Patented Apr. 16, 1901.
F. M. PETERS & H. H. HUNGERFORD.
MACHINE FOR WRAPPING AND LABELING PACKAGES.
(Application filed Oct. 27, 1899.)
(No Model.)
17 Sheets—Sheet 14.
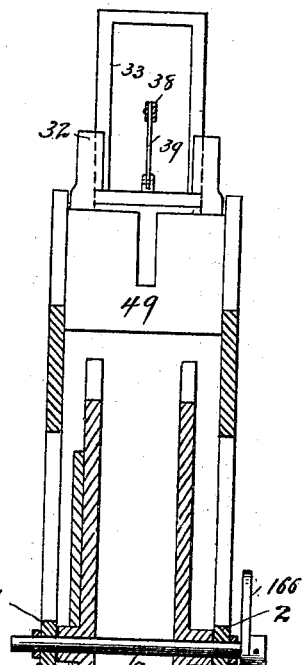
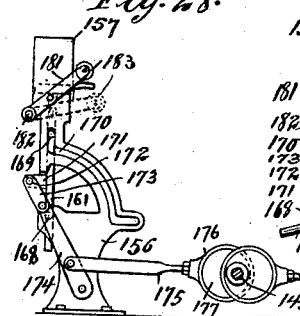
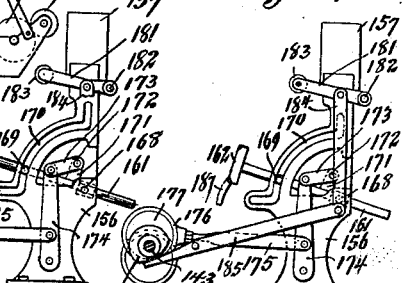
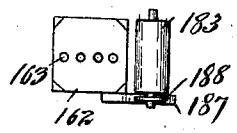
Witnesses,
Inventors,
Frank M. Peters,
Henry H. Hungerford,
By Offield, Towle & Linthicum,
Atty's.

No. 672,286. Patented Apr. 16, 1901.
F. M. PETERS & H. H. HUNGERFORD.
MACHINE FOR WRAPPING AND LABELING PACKAGES.
(Application filed Oct. 27, 1899.)
(No Model.)
17 Sheets—Sheet 15.
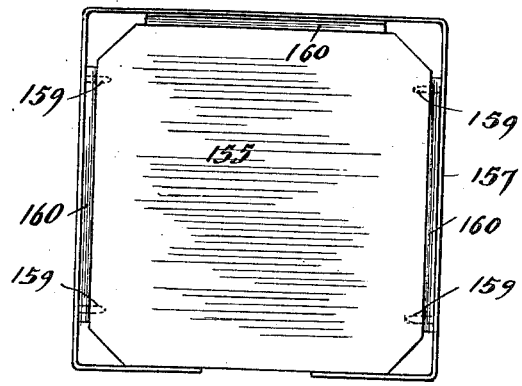
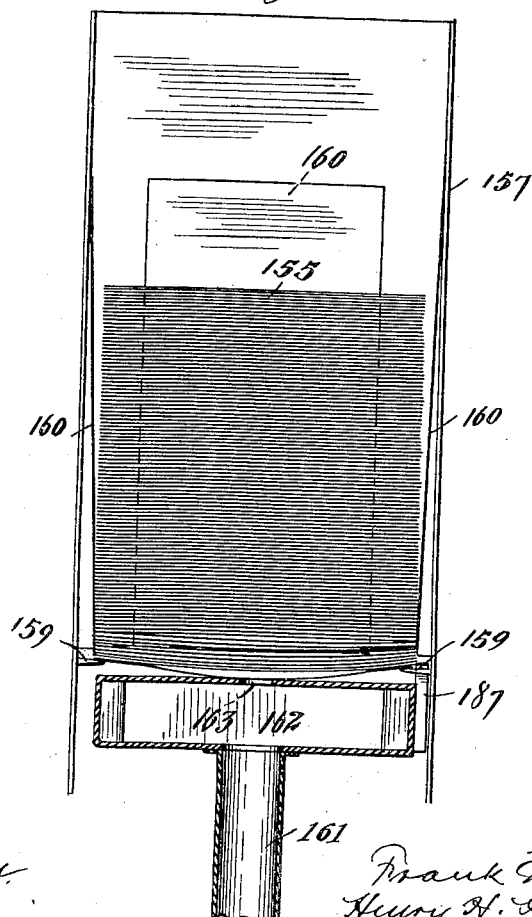

No. 672,286. Patented Apr. 16, 1901.
F. M. PETERS & H. H. HUNGERFORD.
MACHINE FOR WRAPPING AND LABELING PACKAGES.
(Application filed Oct. 27, 1899.)
(No Model.)
17 Sheets—Sheet 16.

Witnesses,
Inventors,
Frank M. Peters
Henry H. Hungerford
By Offield, Towle & Linthicum
Attys.

No. 672,286. Patented Apr. 16, 1901.
F. M. PETERS & H. H. HUNGERFORD.
MACHINE FOR WRAPPING AND LABELING PACKAGES.
(Application filed Oct. 27, 1899.)
(No Model.) 17 Sheets—Sheet 17.
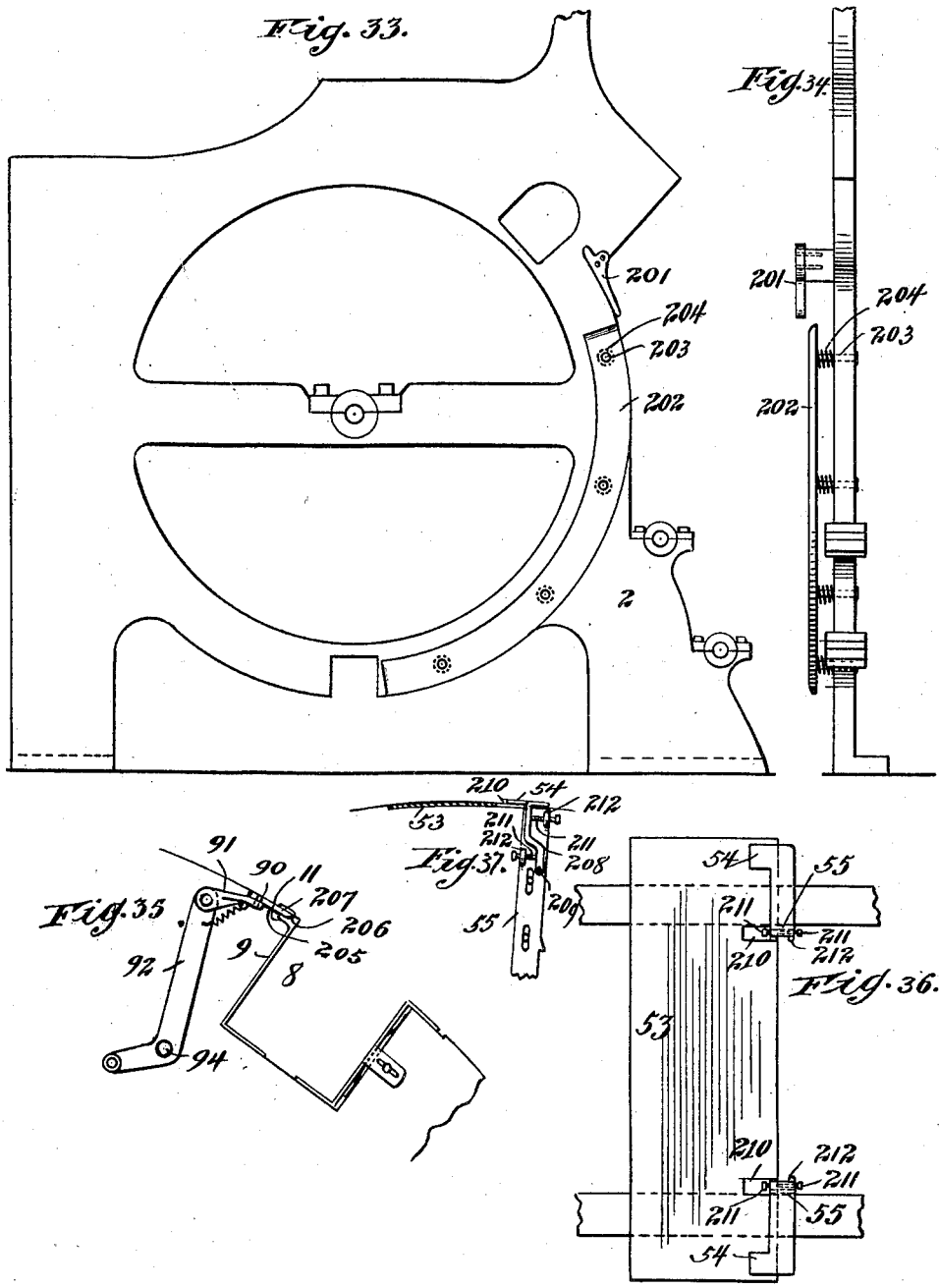

UNITED STATES PATENT OFFICE.

FRANK M. PETERS AND HENRY H. HUNGERFORD, OF CHICAGO, ILLINOIS; SAID HUNGERFORD ASSIGNOR TO SAID PETERS.

MACHINE FOR WRAPPING AND LABELING PACKAGES.

SPECIFICATION forming part of Letters Patent No. 672,286, dated April 16, 1901.

Application filed October 27, 1899. Serial No. 734,955. (No model.)

*To all whom it may concern:*

Be it known that we, FRANK M. PETERS and HENRY H. HUNGERFORD, of Chicago, Illinois, have invented certain new and useful Improvements in Machines for Wrapping and Labeling Packages, of which the following is a specification.

This invention relates to machines for wrapping and labeling packages, it being primarily intended for use in placing around a package such as is set forth in Letters Patent No. 621,974, granted to Frank M. Peters March 28, 1899, an outer wrapper of paper or like flexible material. The apparatus is also preferably designed for use in the application of seals or labels to such packages, and in the preferred construction its organization is such that the labels serve to maintain or aid in maintaining the outer wrapper in proper position around the package. It will be understood, of course, that while the machine is specially organized for the purpose of wrapping and labeling packages of the description pointed out it is capable of use in connection with other packages or articles and, in a general sense, is in no way limited in its application to any particular package or article.

One object of the invention is to provide an automatic mechanism whereby packages or other articles may be wrapped, or wrapped and labeled, with a minimum of labor and at a rapid rate, thus insuring a reduction in the cost of these operations and in the cost of the package.

A further object of the invention is to provide an apparatus which shall apply the outer wrapper in such a manner that the envelop of the package shall not come into contact with the paste or glue employed, so that the contents of said envelop is not exposed to damage by the moisture which might otherwise penetrate through the envelop thereof.

To these and other ends the invention consists in certain novel features which we will now proceed to describe and will then particularly point out in the claims.

Figure 2:
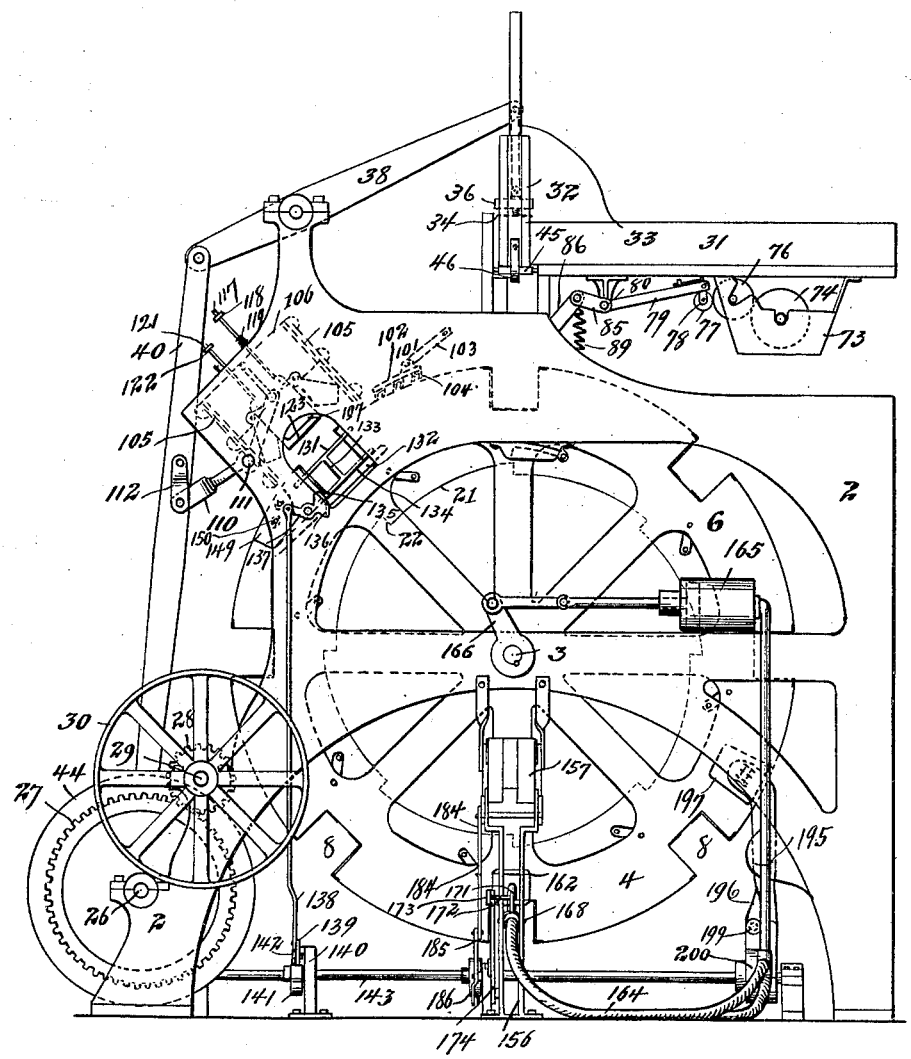
Figure 31:
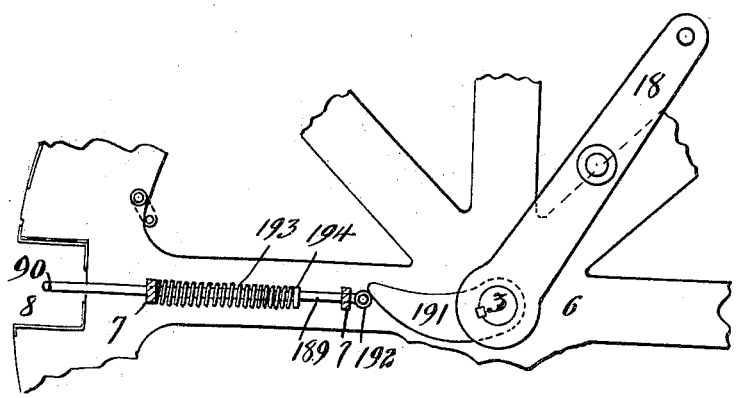
Figure 32:
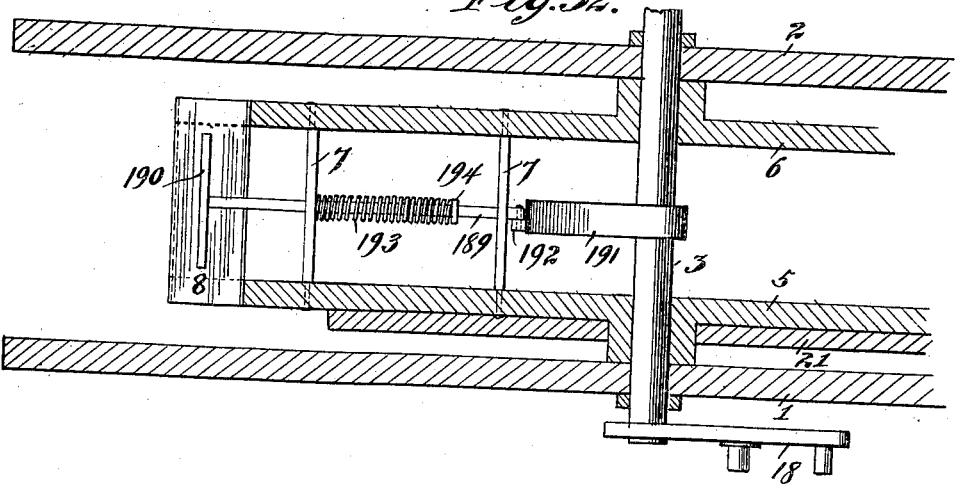

In the accompanying drawings, Figure 1 is a side elevation of a machine embodying our invention in one form. Fig. 2 is a similar view showing the opposite side of the machine. Fig. 3 is a plan view with parts omitted. Fig. 4 is a sectional view, partly in elevation and on an enlarged scale, of the upper portion of the machine. Fig. 5 is an elevation, partly in section, of the upper portion of the machine, showing the moving parts in a more advanced position than that shown in Fig. 4. Fig. 6 is a view similar to Fig. 5, showing another and more advanced position of the parts. Fig. 7 is a plan view of a portion of the folding mechanism viewed in the direction of the arrow in Fig. 8. Fig. 8 is a side elevation of the mechanism shown in Fig. 7, the same being shown in the position it assumes some time after its operative movement has begun. Fig. 9 is a view similar to Fig. 8, showing the position of the parts after the operative movement of the folding mechanism in one direction is completed. Fig. 10 is an end view of the wrapped package before the application of the label thereto. Fig. 11 is a similar view after the application of the label. Fig. 12 is an end elevation of the carton or package, the wrapper being shown in section. Fig. 13 is a plan section of the mechanism for guiding and folding the last flaps of the ends of the wrapper. Fig. 14 is a side elevation of the same, showing the parts in the position which they assume before the folding of the last flaps has begun. Fig. 15 is a view similar to Fig. 14, showing the position of the parts as the folding of the last flaps approaches completion. Fig. 16 is a sectional view of the structure shown in Fig. 13. Fig. 17 is a plan view, partly in section, of the package-feeding mechanism. Fig. 18 is a vertical sectional view of the same, partly in elevation. Fig. 19 is a plan view of a portion of the rotary carrier and some of its associated mechanism. Fig. 20 is a detail elevation of the brake mechanism. Fig. 21 is a plan section of the lower portion of the apparatus. Fig. 22 is a detail sectional view taken on the line 22 22 of Fig. 21. Fig. 23 is a detail sectional view taken on the line 23 23 of Fig. 21. Fig. 24 is a detail sectional view taken on the line 24 24 of Fig. 21. Fig. 25 is a central vertical section illustrating the labeling mechanism, the main portions of the wrapping mechanism being omitted. Fig. 26 is a detail plan view of a portion of Fig. 25. Fig. 27 is a view similar to Fig. 25, illustrating the label-pasting mechanism. Fig. 28 is a view of a portion of Fig. 25, showing a different position of the parts. Fig. 29 is an enlarged detail plan view of the hopper containing the labels. Fig. 30 is a vertical sectional view of the same. Fig. 31 is an enlarged detail view, partly in vertical section, showing one of the ejectors. Fig. 32 is a plan section of the same mechanism. Fig. 33 is an elevation of the inner face of one of the sides of the frame, showing certain adjunctive devices applying thereto. Fig. 34 is an edge view of a portion of Fig. 33. Fig. 35 is an enlarged detail view showing a modification of the folding-blade and carrier, and Figs. 36 and 37 are respectively a plan view and an elevation showing a modification of the gripping devices.

In the said drawings the main frame, which supports the various mechanisms of which the apparatus is composed, is shown as constructed of two parallel vertical parts 1 and 2, suitably connected. In suitable bearings in this frame is mounted a shaft 3, which is capable of oscillation in said bearings, and on this shaft there is mounted loosely, so as to revolve thereon, a rotary carrier 4, located within the main frame and preferably composed of two parallel wheel-like parts 5 and 6, suitably connected by cross-bars 7 or in any other approved manner. This rotary carrier is provided at its periphery with a plurality of recesses or receptacles 8, open at the sides of the carrier and at the peripheral margin thereof. These receptacles may be formed in any suitable manner, and in the particular construction shown these receptacles are formed by means of rectangular notches in the marginal portions of the wheel-like parts 5 and 6 and transverse radial plates 9 and 10 seated in the notches thus formed. One of the plates—as, for instance, the plate 9—is a fixed plate, having a right-angle flange 11 at its inner end, which forms a portion of the bottom of the receptacle, and a reversely-arranged right-angle flange 12 at its outer end, which extends across the peripheral portion of the carrier and forms a bearing-plate. The other transverse plate 10 is a yielding plate provided with a bottom flange 13, corresponding with the flange 11 of the plate 9, and with a top flange 14, corresponding with the flange 12 of the plate 9. The yielding plate 10 is provided with slotted lateral lugs 15, through which pass guide-pins 16, and springs 17 are arranged back of said plate, one at each side thereof, so as to permit said plate to yield and at the same time cause it to be moved toward its companion plate 9 with a yielding pressure, so as to grasp the package between them.

An intermittent rotary motion is imparted to the carrier 4, and we prefer to employ for this purpose the particular mechanism shown. In this construction there is secured on the rock-shaft 3 a vibrating arm 18, to the free end of which is pivoted a pawl 19, the free end of which is drawn inward toward the shaft 3 by means of a spring 20. The rotary carrier 4 has secured to one of its lateral wheel-like plates a ratchet-wheel 21, with the teeth 22 of which the pawl 19 successively engages, the tooth 23 of said pawl riding upon the periphery of the ratchet-wheel in such a position as to insure this engagement. A vibrating movement is imparted to the arm 18 by means of a connecting-rod or pitman 24, the upper end of which is pivoted to said arm, while its lower end is connected to a crank 25 on a rotating shaft 26, mounted in suitable bearings in the main frame. The shaft 26 is provided with a gear-wheel 27, with which meshes a pinion 28 on the main shaft 29, this latter shaft being provided with a pulley 30, by means of which power is supplied to actuate the machine through the medium of a belt or in any other suitable manner from any convenient source of power.

Located above the rotary carrier is a trough or chute 31, which is adapted to receive the packages to be wrapped and along which they may be fed in any suitable manner. This chute is preferably of a width equal to the length of the packages, and at its discharge end, which is located immediately above the uppermost portion of the rotating carrier 4, there are located vertical ways 32, in which reciprocates a plunger 33. This plunger is preferably a yielding plunger, its lower portion 34, which actually comes into contact with the packages, being in the form of a plate having guide-pins 35, which extend up through apertures in the upper portion 36 of the plunger, springs 37 being interposed between the two parts in the manner shown in detail in Fig. 18 of the drawings. Vertical movement is imparted to the plunger 33 by means of a lever 38, the forward end of which is connected, by means of a link 39, with the plunger, while its rear end is connected with the upper end of a rod 40. The lower end of the rod 40 is guided by means of a link 41, hung loosely on the shaft 29, and said lower end is provided with a pin 42, which engages a cam-groove 43 in a cam-wheel 44, secured on the shaft 26. At the lower ends of the ways 32 are located two pivoted supporting-plates 45, one at each side, these plates projecting normally beyond the inner faces of the ways in a horizontal position, as shown in Fig. 18, and being held in that position by springs 46. The plates 45 are of such dimensions that when they are in their normal position the distance between their edges is less than the length of the package, which latter is indicated at 47. The upper surfaces of the plates 45 are normally on a level with the upper surface of the floor of the trough or chute 31, so that the packages lying within said chute may be readily introduced below the plunger 33 by simply pressing them so as to cause them to move along the chute toward said plunger. Upon the downward motion of the plunger the plates 45 will yield and permit the package and plunger to pass, the plates having a sufficient grip upon the package to prevent its falling by gravity. Below the plates 45 the package passes between guideways 48, carried by the supporting-brackets 49, which support the trough or chute 31 upon the main frame. In order to prevent the package from falling by gravity, these ways may be provided with springs 50 or other suitable means for offering some slight resistance to the descent of the package.

The plunger 33 is provided on that portion thereof adjacent to the end of the chute 31 with upwardly-extending rods 51, which serve to close the discharge end of the chute, and thereby prevent the feeding forward of the packages while the plunger is depressed.

At one side of the rotating carrier 4 and slightly below the top thereof, in the plane of its rotation, is located a table 52, which is adapted to receive the wrappers in which the packages are to be inclosed and from which said wrappers may be readily fed forward to the carrier. Between each of the recesses or receptacles 8 there is located at the periphery of the carrier a transverse supporting-plate 53, forming also a fixed gripping-jaw, and above the rear edge of this plate there is located, near each lateral margin thereof, a movable gripping-jaw 54, carried by an arm 55, extending downward along the inner face of the corresponding side member of the carrier and provided with slots 56, through which guide-pins 57 extend. These movable gripping-jaws are normally depressed by means of springs 58, which bear upon arms 59, the free ends whereof pass between pins 60 on the arms 55. The arms 59 are secured on a transverse rock-shaft 61, upon the projecting end of which, outside of the body of the carrier 4, there is located an arm 62, having a pin 63. Upon the main frame there is secured a fixed cam 64, arranged in the path of the pin 63 and adapted by its contact therewith to rock the shaft 61 and raise the gripping-jaws 54. In order to hold these jaws in their raised position for a brief period, one of the arms 55 is provided with a tooth or projection 65, and there is mounted on the inner face of the carrier adjacent thereto a pivoted pawl or dog 66, adapted to engage said projection with one of its ends. To the other end of said pawl is pivoted one end of a link 67, the opposite end of which is provided with a pin 68, which extends through a slot 69 in the side of the carrier-wheel and has its projecting extremity lying in the path of the end of the pawl 19. A spring 70 acts upon the link 67, and consequently upon the pawl 66, in such manner as to cause the free end of said pawl to tend to engage with the projection 65. A second fixed cam 71 on the main frame is also located in the path of the pins 63 and serves to rock the shaft 61 sufficiently to similarly raise the gripping-jaws 54, but not sufficiently to cause the pawls 66 to engage with the projections 65.

This portion of the mechanism operates in the following manner: As each successive pair of gripping-jaws 53 and 54 approaches the edge of the table 52 the pin 63 comes in contact with the fixed cam 64, and the jaws 54 are raised in the manner shown in detail in Fig. 4 of the drawings. While the parts are in this position the carrier becomes stationary, and the edge of the wrapper-sheet, which sheet is indicated at 72, is introduced between the jaws in the manner shown in said figure. The jaws 54 are held raised by means of the pawl 66, so as to permit the introduction of the sheet, and are then released by the coming into contact of the front end of the pawl 19 with the pin 68, which so moves the link 67 as to disengage the pawl 66 from the projection 65 and permit the springs 58 to depress the jaws so as to grip the paper. The carrier then advances until the receptacle 8 comes uppermost, immediately underneath the plunger 33, in which position the movement of the carrier is arrested, and the wrapping-sheet lies across the open mouth of the receptacle 8 in the manner indicated in Fig. 4. At this time the pin 63 comes into contact with the fixed cam 71 and raises the jaws 54 sufficiently to release the wrapper. The plunger 33 then descends, carrying downward with it a package, which it forces into the receptacle 8, at the same time drawing the wrapper downward into the receptacle and around the bottom and two sides of the package. Preferably the wrapper is of such a length and the gripping-jaws are so arranged relatively to the receptacle 8 that after the package has been pressed into the receptacle the upstanding edges of the wrapper are, as indicated in Fig. 5 of the drawings, of differing lengths, that at the rear being comparatively short and that at the front being comparatively long. It will also be understood that the wrapper is of such a width that its marginal portions project some distance beyond the lateral faces of the carrier 4. As soon as the wrapper is applied to the rotating carrier and its edge clamped thereon paste or glue is applied to said edge by means of the following mechanism: 73 indicates a paste-trough, which in the present instance is shown as supported underneath the chute 31, in which trough there is located a paste-roller 74, which may be driven from any suitable source of motion by means of a pulley 75 on its shaft or axis, or in any other suitable manner. The roller 74 runs in the paste and imparts motion to a second or doffer roller 76, which rests against the roller 75 and is driven therefrom by frictional contact, receiving from its surface a constant supply of paste. 77 indicates a paste-applying roller which is normally in contact with the roller 76, being carried by lugs 78, which are pivoted to arms 79, attached to a rock-shaft 80. Each lug 78 has a projection 81, against which a spring 82 bears in such a manner as to tend to force the roller 77 against the roller 76 and hold the rollers in contact with each other with a yielding pressure. The lugs 78 are also provided with stop projections 83, which by their contact with adjustable screws 84, carried by the arms 79, serve to limit the motion of the lugs 78. Intermittent oscillatory movement is imparted to the rock-shaft 80 by means of an arm 85, secured thereon and having pivotally connected to its free end the upper end of a connecting-rod 86, the lower end of which is provided with an elongated slot 87. The arm 18 is provided with a pin 88, which travels in the slot 87, and in the present instance we have shown this pin as being identical with the pivot-pin by means of which the pawl 19 is connected with the arm 18. A spring 89, connected to the arm 85 and to the main frame, serves to hold the arms 79 normally in the raised position shown in Figs. 4 and 6, with the roller 77 in contact with the roller 76. As soon as the gripping-jaws 54 have seized the forward edge of the wrapper-sheet 72 the pin 88 comes into contact with the upper end of the slot 87, and thereby, through the medium of the connecting-rod 86 and arm 85, so oscillates the rock-shaft 80 as to depress the arms 79 and bring the roller 77 downward into the position shown in Fig. 5 in contact with the forward edge of the paper. The roller 77 is moved over the paper so as to apply paste to the forward edge thereof between the gripping-jaws 54, said roller 77 being of such a length as to pass freely between said jaws. It will be noted that the angle which the lugs 78 make with the surface of the plate 53 is such that the roller presses with a yielding pressure against the wrapper and effectively applies the paste thereto. After the paste has been thus applied to the edge of the wrapper the arm 18 moves away from the upper end of the slot 87, and the spring 89 returns the arms 79 to their elevated position, with the roller 77 in contact with the roller 76, from which it receives a fresh supply of paste. After the package 47 has been forced into place by means of the plunger 33 and the wrapper 72 has been partially wrapped around the same in the manner hereinbefore described, and shown in Fig. 5 of the drawings, the upstanding rear edge of the wrapper is first folded over the top of the package, so that when the upstanding front edge is in turn folded down over the top of the package its pasted or glued edge will come into contact with the outer portion of the rear edge of the wrapper. To this end we employ a folding-blade 90. One of these blades is employed in connection with each receptacle 8, extending when in its normal position transversely of the carrier at the periphery thereof, near the rear edge of the receptacle. Each blade 90 is carried by arms 91, which are pivotally connected to bell-crank levers 92, springs 93 being employed to press the blades inward toward the periphery of the carrier 4, and said springs being preferably interposed between the arms 91 and the upper ends of the bell-crank levers 92. The bell-crank levers are mounted at their angles on an axis 94, extending transversely of the carrier, and there is coiled around said axis a spring 95, the free end of which bears against a rod 96, which connects the inner ends of the bell-crank levers. This rod 96 extends through one side of the carrier 4, and its projecting end is adapted to engage a cam-groove 97 in a fixed cam 98, carried by the main frame on the opposite side to that on which the fixed cams 64 and 71 are located. This fixed cam is so located that after the package has been inserted in the receptacle and the carrier has started to advance a step the bell-crank levers are so rocked as to cause the folding-blade 90 to be projected over the edge of the package 47 in the manner indicated in Fig. 6 of the drawings and to thereby fold down the upstanding adjacent flap of the wrapper in the manner shown in said figure. We have found it advisable to employ means for laying down this flap over the package before it is actually folded by the blade 90 in order to insure a smooth and correct fold, and for this purpose we employ a yielding arm 99, preferably constructed of wire, its body portion extending across the top of the carrier 4, while its arms are passed through suitable keepers or guides 100 and have their extremities connected to the arms 79, which carry the paste-roller 77. From an inspection of Fig. 5 of the drawings it will be seen that when the paste-roller is brought down to apply paste to the following wrapper-sheet the flexible arm 99 will be moved over the top of the carrier in such a way as to wipe over the upstanding adjacent edge of the wrapper which partially surrounds the package and will lay the same down in position upon the top of the package, so that its folding may be readily made permanent by the action of the blade 90. The flexible arm 99, being of the full width of the wrapper, insures the assuming of a proper position by those parts of the wrapper which lie laterally outward beyond the folding-blade 90 when this latter does its work. After the folding-blade 90 has thus folded the rear flap of the wrapper over the top of the package this latter is carried underneath a wiper 101, by means of which the front flap is folded down upon the top of the package and its pasted inner or under edge is pressed against the outer surface of the downwardly-folded rear flap of the wrapper. This wiper preferably comprises a metallic plate 102 or a plate of some similar heavy material of sufficient weight to render the wiper operative by gravity alone. This plate is suspended from the main frame by means of pivoted links 103 and is provided on its under side with pressure devices 104, which are shown as transverse ribs of rubber or other like material adapted to bear with a yielding pressure against the wrapper and package. Obviously other pressure devices, such as rollers, may be substituted for these yielding ribs, and springs may be employed as an aid to or substitute for gravity in pressing the wiper toward its work. It will be understood, of course, that the folding-blade 90 is withdrawn as the front flap of the wrapper is pressed down by the wiper on the rear flap, and to this end the pin 96 passes clear of the cam-groove 97 as the wiper passes over the upstanding front flap, so that the spring-actuated folding-blade is withdrawn as the wiper advances. The wrapper has now been wrapped around the package, so as to inclose four sides thereof, the ends alone being exposed. During a period of rest following that step in advance which carries the package underneath the wiper the folding of these ends is mainly accomplished. For this purpose there is located at the proper point on the main frame an end-folding mechanism, which is best illustrated in Figs. 4, 7, 8, and 9 of the drawings and which is preferably constructed in the following manner: On each side of the carrier there are connected to the main frame radially-arranged ways 105, and in these ways are arranged two sliding plates or cross-heads 106. Each of said plates 106 is provided with an inwardly-extending folding-blade 107, by means of which the top flap of the adjacent end of the wrapper is broken down and folded. There are also pivoted to the cross-heads 106 folding-blades 108 and 109, by means of which the front and rear side flaps of the ends of the package are folded. Motion is imparted to the cross-heads 106 by means of a lever 110, pivoted on an axis 111 between its ends, one of the ends of said lever being connected by a link 112 with the connecting-rod 40, which operates the plunger 33. The other end of the lever 110 is formed into a yoke or bail 113, each end of which is connected by means of a link 114 with the adjacent plate or cross-head 106. Immediately above each cross-head 106 there is provided a flange or shoulder 115. The pivoted folding-blade 108 is provided with an arm 116, to which is pivotally connected the inner end of a rod 117, the outer end of which extends through an aperture in the flange 115 and is provided outside of said flange with a suitable stop, preferably adjustable and consisting in the construction shown of a sleeve or collar 118, adjustable on the rod 117 and adapted to be secured thereon by a set-screw. A spring 119 is interposed between the flange 115 and the collar 118. The folding-blade 109 is provided with an arm 120, to which is pivotally connected the inner end of a rod 121, the outer end of which also extends through an aperture in the flange 115 and is provided outside of said flange with an adjustable collar 122. It will be observed that upon an inward movement of the cross-heads 106 the folding-blades 107 will first break down and fold the upper or outer flaps of the projecting ends of the wrapper. Upon a further inward movement of the cross-head the collar 118 will come in contact with the spring 119, and the motion of the rod 117 being thus arrested the folding-blade 108 will be swung across the rear flap of the projecting end of the wrapper and will fold the same down over the already-folded top flap. The collar 122 will then come into contact with the flange 115 and by arresting the inward movement of the rod 121 will swing the folding-blade 109 over the front flap of the end of the wrapper and will fold this flap over the top and rear flaps, which have already been folded in the manner just described. It will be observed that the collars 118 and 122 are so adjusted and the spring 119 of such a character that one of the folding-blades for folding the side flaps operates shortly before the other folding-blade, so that the flaps are properly folded down over the end of the package in regular order.

In order to positively return the folding-blades to their normal position, the rods 117 and 121 are provided inward from or below the flanges 115 with stops or collars 213, which by their contact with the inner or under side of said flanges will force the folding-blades outward as the cross-heads approach the limit of their outward motion.

In order to insure a proper position of the package within the receptacle during the operation of folding the end flaps of the wrapper, as above described, we employ upon each of the cross-heads 106 a plate 123, mounted on the inner face of said cross-head and frictionally held against the same by screws 124, which pass through slots 125 in the plate 123 and are threaded into the cross-head 106. The plate 123 is also provided with a slot 126 for the passage of the pivot-bolt, by means of which the link 114 is connected to the cross-head 106. At its upper end the plate 123 is provided with a pivoted arm 127, having a projection 128, which is adapted to engage with the under side of the flange 115. A spring 129 serves to throw the arm 127 normally inward toward the flange 115, and the projection 128 is beveled or inclined upon one side and at a right angle relatively to the direction of motion on the other side, so that said projection will slip past the flange 115 when moved in one direction, but will engage with it and act as a stop when the movement in the other direction brings it in contact therewith. The arm 127 is also provided with an extension 130, which lies in the same plane as the cross-head 106 and is adapted to be engaged thereby during the outward movement of the cross-head. It will be seen that when the cross-heads 106 are moved downward or inward the plates 123 come into contact with the package and, pressing against the same a short distance inward from the ends thereof, serve to hold it firmly in position and to properly position it in case it is not in place as it should be. When the plates 123 have reached the inward limit of their motion, which is when the package is in proper position, the movement of the plates 123 ceases, while the cross-heads continue to move inward in order to fold the ends of the wrapper. At this time the projections 128 of the arms 127 have passed beyond and slipped under the flanges 115, and the plates 123 are held firmly locked in position by this means during the operation of folding the end flaps of the wrapper, as above described. After the folding devices carried by the cross-heads 106 have operated said cross-heads are moved outward to disengage the folding devices from the package, and as they approach the limit of their outward motion they come into contact with the extentions 130, and thereby disengage the projections 128 from the flanges 115. The plates 123 are then free to move outward and are so moved by the further movement of the cross-heads, and thereby withdrawn from contact with the package.

After the mechanisms just described have completed the operations set forth there still remain the lower flaps of the wrapper to be folded up against the ends of the package. This folding is accomplished by the devices shown more particularly in Figs. 13, 14, 15, and 16 of the drawings. As a means for holding the last flaps in proper position before they are folded and guiding them in this position to the folding devices proper we employ guiding-wires 131, which extend over supporting-strips 132, secured to the main frame and arranged at right angles to the radius of the carrier 4 in such a position that the bottom of each recess 8 will be substantially on a line with the upper surface of the supporting-strips 132 when opposite that end thereof which the package first approaches, as indicated in Fig. 14. Each guiding-wire 131 is connected by an arm 133 with a rock-shaft 134, mounted on the main frame and provided with a pinion 135, with which meshes a gear-segment 136 on one end of a lever 137, pivoted on the main frame. The other end of said lever 137 is connected by a rod 138 with the outer end of a lever 139, pivoted between its ends on the main frame or upon a standard 140. The inner ends of the levers 139 rest upon a cam 141, being held in contact therewith, if necessary, by means of weights 142. The cam 141 is secured on a shaft 143, extending longitudinally of the machine, near the base thereof, and driven by means of a beveled pinion 144, which meshes with a similar pinion 145 on a vertical shaft 146, having at its upper end a beveled pinion 147, which meshes with a corresponding beveled pinion 148 on the shaft 26. After the folding devices hereinbefore described have operated the cam 141, through the medium of the connecting mechanism described, brings the guiding-wires 131 down upon the bottom flaps of the wrapper in the manner shown in Figs. 13 and 14 of the drawings, said flaps resting upon the supporting-strips 132 and being moved along said strips underneath the wires 131 when the carrier 4 starts upon its next movement of advance. Above those ends of the supporting-strips 132 toward which the package is now moving are located blocks 149, carried by studs 150, which extend into recesses 151 in the main frame, in which recesses said studs are longitudinally movable. Springs 152, interposed between each block 149 and the main frame, as shown in Fig. 13 of the drawings, serve to press the blocks firmly against the ends of the package as this latter is carried by the said blocks. The forward edge of each block 149 is rounded off, as shown at 153, so as to cause the blocks to ride over the ends of the package without displacing the folded ends of the wrapper thereon. The lower or inner edge of each block is rounded off and inclined, as indicated at 154, so that the surface of said block gradually approaches the opposite surface of the corresponding strip 132, as clearly shown in Figs. 14 and 15.

It will be noted that the strips 132 are disposed tangentially to the path of movement of the carrier 4, so that as the package is carried in a curve by the carrier the flaps, which rest upon the supporting-strips 132, are drawn over the inner edges of said strips in the manner indicated in Figs. 15 and 16 of the drawings, and while thus drawn over said edges are folded against the ends of the package. By reason of the approaching surfaces of the blocks 149 and strips 132, between which the ends of the flaps pass, these latter are frictionally held or retarded in such a manner that the last flaps in being folded serve to strain the wrapper tightly around the package and prevent any looseness thereof longitudinally of the package. The blocks 149 as they wipe over the ends of the package serve to firmly set the folds of the wrapper and cause this latter to remain in place until permanently held in their position by the labels in the manner hereinafter set forth. The package, with the wrapper thus folded around it, is shown in Fig. 10 of the drawings, and by the pasting of a label 155 over the ends of the package in the manner shown in Fig. 11 the wrapper is permanently held in position, the label operating as a seal to firmly hold the folded ends of the wrapper in place. This label may be of any desired form—polygonal, circular, or otherwise. While we have referred to the part 155 as a label and propose that it shall ordinarily be a label by reason of its decoration or of the legend placed upon it, the said part may be employed as a seal whether or not it also constitutes a label, and in referring to it hereinafter as a label it will be understood that we include therein a seal, whether printed or otherwise decorated or not. The mechanism by means of which these labels are applied is shown more particularly in Figs. 21, 25, 26, 27, and 28 of the drawings and in a general way in Figs. 1 and 2. At each side of the machine this mechanism is illustrated in duplicate, and we will therefore describe only one of the labeling mechanisms, it being understood that the same description is equally applicable to the other.

Each labeling mechanism comprises a supporting-frame 156, the upper portion of which carries a hopper 157, within which a stock of labels is carried. One of these hoppers is shown in enlarged detail in Figs. 27 and 28 and consists of a body of dimensions somewhat larger than, and a shape substantially conforming to, that of the label to be used and having at one side a vertical opening 158, by means of which access may be readily had to the labels lying within the hopper. The hopper 157 is open both at the top and bottom, and near the open bottom there are provided inwardly-projecting pins 159, upon which the labels rest and are supported by their margins. The hopper is provided longitudinally with springs 160, the upper edges of which are secured to the body of the hopper, while the lower edges are free, and these springs pressing against the edges of the stack of labels within the hopper serve to partially support these latter and prevent their entire weight from coming upon the marginal pins 159. If these springs were omitted, it might be possible for the weight of the labels to bend these latter centrally in such a way as to cause them to slip down past the pins.

161 indicates a hollow arm or tube provided at its inner end with a suction-box 162, the interior whereof communicates with the interior of the tube 161 and the box being provided at its outer or working face with perforations 163, which are preferably arranged in a single line transversely of the face of the box, as shown in Fig. 21 of the drawings. These perforations are preferably confined to the central portion of the suction-box for the reason hereinafter set forth. The opposite end of the tube or hollow arm 161 is flexibly connected—as, for instance, by means of a hose 164—with a suitable air suction or exhaust device—as, for instance, a pump 165, operated by means of an arm 166 on the oscillating shaft 3 or in any other suitable manner. The tube 161 passes through a sleeve-bearing 167, which is pivoted on an axis 168 in the frame 156. The tube 161 is also provided with laterally-projecting pins 169, which extend into slots 170 in the side pieces of the frame 156. These slots 170 comprise a central portion concentric with the axis 168, a portion extending upward from one end of the curved portion toward the hopper 157 and another portion extending from the opposite end of the curved portion toward the carrier 4. The terminal portions of the slot 170 are slightly inclined from the vertical and horizontal, respectively, but are so nearly vertical and horizontal as to make these terms appropriate as a matter of description. Motion is imparted to the tube 161 and suction-box 162 by means of an arm 171, secured to the tube and connected by a pin 172 with a link 173, which is in turn connected to the upper end of a vibrating arm or lever 174. The lower end of this arm 174 is pivoted to the frame 156, and motion is imparted to it by means of a connecting-rod 175, one end of which is pivoted to the lever 174 between its ends, while the other end is provided with a strap 176, which surrounds an eccentric 177 on the shaft 143. The two eccentrics 177 of the two labeling mechanisms are of opposite and equal eccentricity, so that the corresponding movements of the suction-boxes of the two mechanisms are simultaneous and similar.

It will be seen that the rotation of the shaft 143 will first vibrate the levers 174 outward, and the tubes 161, which carry the suction-boxes, will be turned upon the pivots 168, the pins 169 traveling in the curved portions of the slots 170. When the pins have reached the upper ends of the curved portions of said slots, further outward movement of the levers presses the tubes 161 upward through the sleeves 167, the pins 169 moving through the vertical portions of the slots 170, so that the suction-boxes are moved up into the open lower ends of the hoppers 157 and brought into contact with the undermost of the labels in said hoppers. The pump 165 at this time begins to exhaust the air from the suction-boxes, and the lowermost label in each hopper is caused to adhere to the corresponding suction-box along its central line. The levers 174 thereupon begin their return stroke, and the suction-boxes are first carried vertically downward and inward, the pins 169 moving along the vertical and curved portions of the slots 170. It will be seen that as each label is held to its suction-box by its central portion only the said label is stripped from the bottom of the pile without displacing those above by having its central portion drawn down, as illustrated in Fig. 30, until its edges pass clear of or slip from the pins 159. When the pins 169 reach the lower end of the curved portions of the slots 170, further movement of the levers 174 causes the suction-boxes to move toward each other and toward the package in the receptacle 8, which is at that time in the lowermost portion of the wheel and directly in the line of movement of the suction-boxes as they approach each other. The labels having previously been supplied with paste in the manner hereinafter described, they are simultaneously pressed against the opposite ends of the package, so as to complete the same. At the same time the pump 165 having ceased its operative stroke, whereby the air is exhausted from the suction-boxes, these latter release their hold on the labels and are retracted, leaving the labels pasted in position and the package complete as to its wrapping.

The mechanism for applying paste to the labels is also in duplicate, there being located on each side of the machine a paste-trough 177ª, in which is located a power-driven paste-roller 179 and a doffer-roller 180 in contact therewith.

181 indicates a frame pivoted at 182 to the frame 156 and carrying a paste-applying roller 183, which may be brought into contact either with the paste-roller 180 or with the label as it lies upon the suction-box. Each frame 181 is operated by means of a link 184, the upper end of which is pivoted to the frame 181, while its lower end is connected to the outer end of a lever 185. The inner ends of the levers 185 are in contact with a cam 186 on the shaft 143. By reason of this construction each frame 181 is so actuated that as the corresponding suction-box passes underneath it, carrying a label from the hopper to the package, said frame is depressed and its paste-roller brought into contact with the exposed face of the label, so as to apply the necessary paste thereto. After the label has been thus supplied with paste each frame 181 is so vibrated as to bring its roller 183 into contact with the corresponding roller 180, thereby obtaining a fresh supply of paste. It will be noted that each suction-box is provided with a guard-finger 187, while the axis of the paste-applying roller 183 is provided with a guard roller or wheel 188, the two parts being so arranged, as shown in Fig. 26, that the guard-roller and guard-finger come into contact before the paste-roller has an opportunity to come into contact with the suction-box or the label thereon, and the guard-finger is so curved or inclined that the contact of the paste-roller with the label is gradual and gentle and any spattering of the paste or contact between the paste-roller and the exposed portion of the suction-box is prevented.

We have provided automatic mechanism whereby the packages after having been wrapped and labeled are discharged from the carrier, such mechanism being shown in detail in Figs. 31 and 32 of the drawings. Mounted to slide radially in the cross-bars 7 is a radially-movable ejector-rod 189, which is preferably rectangular or otherwise so shaped as to prevent rotation, the apertures in the cross-bars being similarly shaped. The outer end of each ejector-rod 189 is provided with a suitable cross-piece 190, adapted to engage the package, while its inner end is adapted to engage a cam 191, secured on the rock-shaft 3. A roller 192 is preferably provided at the inner end of each ejector-rod, so as to diminish the friction when said rod is in contact with the cam 191. A spring 193, coiled around the rod 189 and bearing at one end against one of the cross-bars 7, while its other end abuts against a collar 194 on the rod 189, serves to retract the ejector-rod or draw it normally inward toward the center of the carrier. It will be seen that as each receptacle with its wrapped and labeled package therein approaches the proper point the cam 191 will come into contact with the inner end of the corresponding ejector-rod 189 and will force the same radially outward, so as to discharge the package from the carrier, the ejector being returned to its normal position by the spring 193 after the cam 191 has been passed.

We deem it advisable to provide a suitable braking mechanism, by means of which the motion of the carrier may be positively arrested upon the completion of each intermittent movement thereof and by means of which said carrier may be positively held stationary until the period for the next advance or step has arrived. For this purpose we prefer to employ the brake mechanism shown, which is one which we have devised. In that construction, which is shown more particularly in Fig. 20 of the drawings, there is mounted on the inner face of each side of the frame a bracket 195, to which is centrally pivoted a lever 196, the upper end of which lever is provided with a pivoted friction-shoe 197, which may, if desired, be provided with a special friction-surface and which is adapted to bear upon the outer or lateral face of the carrier 4, as indicated in Figs. 1 and 2 of the drawings. The lower end of each lever 196 has pivoted to it an extension $197^a$, the upper end of which is provided with an adjustable screw 198 and cushioning-springs 199, interposed between said extension and the body of the lever 196. The lower end of each extension 197 bears against a corresponding cam 200, said cams being so arranged that their eccentricities are opposite and equal. These cams are so constructed that at the end of the forward movement of the carrier they press the friction-shoes against the sides thereof and arrest its motion, holding the carrier stationary. This pressure is a yielding one by reason of the presence of the springs 199 and may be controlled by the adjusting-screws 198. After the stationary period is completed and the carrier is to advance another step the cams 200 release the pressure of the friction-shoes 197 and the carrier is free to move as before.

We have heretofore described in detail the mode of operation of the different mechanisms of which the apparatus is composed, and it only remains necessary to describe in a general way the operation of wrapping a package with the machine constructed in the manner hereinbefore described. The parts being in the position shown, for instance, in Fig. 4 of the drawings, a wrapper is inserted with its front edge under the gripping-jaws 54 and resting upon the plate 53. Before the carrier starts upon its forward movement the gripping-jaws 54 are tripped and allowed to clamp the edge of the paper, while the paste-roller is brought down and paste is applied to said edge. The carrier then makes a forward step, bringing the wrapper and the receptacle over which it lies immediately underneath the plunger 33. This plunger thereupon descends and forces a package into the receptacle, carrying the central portion of the wrapper down into the receptacle along with it. At the same time the front edge of the wrapper is released, and shortly afterward the arm 99 wipes over the upstanding rear edge of the wrapper. The carrier then makes another step in advance, during which the folding-blade 90 folds the rear flap of the wrapper permanently over the top of the package and withdraws as the front edge or flap of the wrapper is folded down by passing underneath the wiper 101. While the carrier is stationary after having passed the wiper, the top and side flaps of both ends of the wrapper are folded in proper order by the mechanism provided for that purpose, the package being firmly held in place during these operations, and as the carrier again starts on its forward movement the lower flaps are folded against the ends of the package, thus completing the folding of the wrapper around the package. The folds are so pressed as to permanently define the folds, and the wrapper is drawn tightly around the package during the folding of the last flaps. When the package thus folded has reached the proper point in the machine, the carrier again remains stationary, while the paste-covered labels are applied to its ends by the mechanisms provided for that purpose, these labels being seized and drawn from the hoppers by the suction-boxes held during the application of paste thereto and the carrying of them to the package and released as soon as they have been applied to the package. The carrier then continues its intermittent movement until the package has reached the point of discharge, whereupon during the stationary period of the carrier the ejector acts to force the package out of its receptacle and deliver it completed from the machine.

It is obvious that the apparatus hereinbefore described may be modified in various ways without departing from the principle of our invention. For instance, although the particular mechanism set forth is organized for the purpose of applying the wrapper in such a manner that no portion of the paste comes into contact with the box or carton around which the wrapper is placed, it will be seen that numerous features of the mechanism may be employed in an apparatus so organized that the wrapper may be wholly or partly pasted directly upon the box or carton in case such an application of the wrapper is deemed desirable or permissible. Ordinarily, however, it is advantageous where the character of the goods contained by the package is such as to render damage from moisture possible to apply the wrapper in the manner hereinbefore set forth. Again, although we have described an apparatus wherein paste is used as the means for securing the wrapper it is obvious that other adhesive substances, such as glue, might be used. Although we have shown the wrappers as fed to the machine in separate sheets, it is apparent that they might be so fed from a continuous roll and be severed after their front edges are in position on the roller. The labeling mechanism may be omitted and the end flaps secured by direct pasting, or the labeling mechanism may be employed in the application of labels to packages thus secured by direct pasting of the flaps. While the package-feeding and wrapper-gripping mechanisms are desirable adjuncts, these mechanisms or either of them may be dispensed with or other mechanisms substituted for those which we have devised. In Figs. 33 and 37 of the drawings we have shown certain modifications and additions which we deem desirable. Although ordinarily the spring-plates of the receptacles are sufficient to retain the packages in the receptacles during the operation of folding the last end flaps, we may provide for this purpose a holding device 201, supported on the frame of the machine and bearing against the outer face of the packages as they pass underneath it while the wrapper is being strained around them. This device may be in the form of a fixed or spring shoe, as shown, or it may consist of or be provided with one or more rollers. We also prefer to employ means for holding the end folds in position after these folds are formed until the seals or labels are applied thereto, and for this purpose we employ fold-retaining guides or plates 202, mounted on the main frame and extending from the end-folding devices to the pasting devices on each side of the carrier, being so positioned that they will bear against the end folds of the package and hold them in place. We prefer for this purpose to mount these plates upon pins 203, sliding in suitable recesses in the frame and having springs 204 interposed between the plates and frame, as indicated in Fig. 34, so as to hold the plates in position with a yielding pressure. In Fig. 35 we have shown the carrier as provided with a recess or opening 205 for each of the folding-blades 90, and the adjacent plate 9, which defines the wall of the adjacent receptacle 8, is provided at the junction of its body with its flange 11 with an incline 206, upon which the forward end of the folding-blade may ride, so that said blade is lifted over the edge of the package which lies within the receptacle and is thereby prevented from damaging the package or its inclosing envelop. We also prefer to provide the upper surface of each folding-blade 90 with a plurality of ribs 207, which prevent the pasted edge of the wrapper from coming into direct contact with the said upper surface of the blade, and thereby covering it with paste. In order to determine and adjust the position of the wrappers upon the carrier, the gripping-jaws 54 are provided with adjustable stops 208, which in the preferred form are pivoted at their lower ends to the corresponding arms 55, as indicated at 209, their upper ends projecting above the supporting-plates 53, which are slotted, as shown at 210, to permit their passage. These stops are adjusted by means of set-screws 211, passing through threaded apertures in lugs 212 on the arms 55 and bearing upon opposite sides of the adjustable stop-arms 208.

Numerous other modifications in the details of construction hereinbefore set forth may evidently be made without affecting the substance of the invention, and we therefore do not wish to be understood as limiting ourselves strictly to the precise construction hereinbefore set forth, and shown in the drawings.

We claim—

1. In a wrapping-machine, the combination with an intermittently-rotating carrier having peripheral receptacles and intermediate supporting-surfaces, of grippers mounted on said carrier, and adapted to grip the forward edge of the wrapper upon said supporting-surface, a vibrating pasting mechanism and means for actuating the same whereby to apply paste to the front edge of the wrapper while held on said surface, substantially as described.

2. In a wrapping-machine, the combination, with an intermittently-rotating carrier having peripheral supporting-surfaces, of spring-actuated grippers mounted on said carrier and coöperating with said supporting-surfaces, means for raising said grippers, means for holding said grippers in a raised position, and means connected with the carrier-operating mechanism for releasing said holding means and causing the grippers to descend before the carrier starts to move, substantially as described.

3. In a wrapping-machine, the combination, with a carrier provided with peripheral supporting-surfaces and with a pawl-and-ratchet mechanism for imparting thereto an intermittent motion, of radially-movable grippers mounted on said carrier and coöperating with the supporting-surfaces, springs for moving said grippers inward, means for actuating said grippers in the opposite direction, a dog for holding said grippers in their outward or elevated position, and mechanism actuated by the pawl for tripping said dog, substantially as described.

4. In a wrapping-machine, the combination, with an intermittently-rotating carrier having peripheral supporting-surfaces to receive the wrappers, of grippers provided with adjustable stops to determine the position of the front edge of the wrappers, substantially as described.

5. In a wrapping-machine, the combination, with a carrier having a supporting-surface and grippers, of a rock-shaft provided with arms having pivoted and spring-actuated lugs, a paste-applying roller mounted in said lugs, a source of supply of paste, a spring for holding said paste-applying roller normally in contact with said source of supply, and means for intermittently actuating said rock-shaft to press said paste-applying roller against the wrapper as it lies upon the supporting-surface of the carrier, substantially as described.

6. In a machine of the character described, the combination, with the carrier and its supporting-surfaces, of a source of supply of paste, a rock-shaft having arms provided with adjustable stop-screws, spring-actuated lugs pivoted to said arm and having stop projections to engage the screws, and a paste-applying roller mounted in said lugs, substantially as described.

7. In a machine of the character described, the combination, with a rock-shaft provided with arms and a paste-applying roller carried thereby, said rock-shaft having a crank-arm, of a carrier provided with a ratchet-wheel, a rock-shaft having an arm provided with a pawl to coöperate with said ratchet-wheel, a pin on said arm, and a rod pivotally connected to the crank-arm of the first-mentioned rock-shaft and provided with a slot to receive the pin on the arm of the second rock-shaft, substantially as described.

8. In a wrapping-machine, the combination, with an intermittently-rotating carrier having peripheral receptacles and folding-blades adapted to be projected over said receptacles, of a yielding arm adapted to wipe over the receptacles prior to the action of the folding-blade, and means for actuating said arm, substantially as described.

9. In a wrapping-machine, the combination, with an intermittently-rotating carrier having peripheral receptacles of less width than the wrapper, of folding-blades carried by said carrier and adapted to be projected over the receptacle, said blades being also of less width than the wrapper, a yielding arm of a width substantially equal to that of the wrapper and adapted to wipe over the same prior to the action of the folding-blades proper, and means for actuating said arm, substantially as described.

10. In a wrapping-machine, the combination, with an intermittently-rotating carrier having peripheral receptacles and intermediate supporting-surfaces, of a rock-shaft having arms provided with a paste-applying roller, and a yielding arm connected with said rock-shaft arms and provided with suitable guides, whereby said yielding arm is adapted to wipe over a receptacle when the paste-applying roller is depressed, substantially as described.

11. In a wrapping-machine, the combination, with a carrier having peripheral receptacles and inclines adjacent thereto, of vibrating arms pivoted on the carrier, and spring-actuated folding-blades pivoted to said arms and adapted to ride over the inclines and be projected over the receptacles, substantially as described.

12. In a wrapping-machine, the combination, with an intermittently-rotating carrier having peripheral receptacles, of folding-blades mounted on the carriers and adapted to be projected over the rear edge of the adjacent receptacles to fold down the rear flap of the wrapper, and a suspended wiper adapted to bear against the periphery of the carrier and to fold the front flap of the wrapper upon the rear flap, substantially as described.

13. In a wrapping-machine, the combination, with a carrier provided with peripheral recesses, of a folding-blade pivoted adjacent to the rear edge of each receptacle, means for projecting said folding-blade over the receptacle to fold down the rear flap of the wrapper, a wiper bearing upon the periphery of the carrier and adapted to fold down the front flap of the wrapper upon the rear flap by the movement of the package beneath it, and means for withdrawing the folding-blade as the front flap is folded, substantially as described.

14. In a wrapping-machine, the combination, with means for applying paste to the front edge of the wrapper, of an intermittently-rotating carrier having peripheral receptacles and means for holding the wrapper with its body over the receptacle, means for forcing a package and the body of the wrapper into the receptacle, a folding-blade adapted to be projected over the receptacle to fold down the rear flap of the wrapper, and a wiper resting upon the periphery of the carrier and adapted by the movement of the carrier beneath it to fold down the front flap of the wrapper and press its pasted edge upon the outer face of the rear flap thereof, substantially as described 15. In a wrapping-machine, the combination, with an intermittently-rotating carrier having peripheral receptacles for the package and wrapper, and means for folding the rear flap of said wrapper, of a wiper suspended by links from a fixed point and pressing by gravity against the periphery of the carrier to fold the front flap of the wrapper, substantially as described.

16. In a wrapping-machine of the character described, the combination, with a rotating carrier and a frame therefor, of a wiper provided with transverse flexible ribs, and links connecting said wiper with the frame, whereby it is free to press by gravity against the carrier, substantially as described.

17. In a wrapping-machine, the combination with an intermittently-rotating carrier having peripheral receptacles of end-folding devices comprising radially-movable plates for folding the top end flaps and pivoted blades for folding the front and rear end flaps and connecting mechanism between the plates and the blades whereby the blades are operated by the plates during the forward movement of the plates substantially as described.

18. In a wrapping-machine, the combination with an intermittently-rotating carrier having peripheral receptacles of end-folding devices, comprising radially-movable plates for folding the top end flaps and pivoted blades for folding the rear and front end flaps and separate connecting mechanisms between the plates and each of the blades whereby the folding-blades are operated to successively fold the rear and front end flaps during the forward movement of the blades substantially as described.

19. The combination, with an intermittently-rotating carrier having peripheral receptacles, of end-folding devices, each comprising a radially-movable plate to fold the top flap, folding-blades pivotally mounted on said plate and provided with operating-rods having terminal stops, a fixed part through which said rods pass, and a spring interposed between said fixed part and the stop of one of said rods, substantially as described.

20. In a wrapping-machine, the combination, with an intermittently-rotating carrier having peripheral receptacles, of radially-movable end-folding devices for operating upon the ends of a package while in a receptacle, and means connected with said folding devices for positioning and holding the package while thus operated upon, substantially as described.

21. In a wrapping-machine, the combination, with an intermittently-rotating carrier having peripheral receptacles, of radially-movable end-folding devices for operating upon the ends of a package while in a receptacle, means connected with said folding devices for positioning and holding the package while thus operated upon, and means for locking said positioning and holding means during said operation, substantially as described.

22. In a wrapping-machine, the combination, with a rotating carrier having peripheral receptacles and means for partially folding a wrapper around a package in one of said receptacles, of means for folding the last end flaps of the wrapper and means acting conjointly therewith for straining the wrapper around the package, substantially as described.

23. In a wrapping-machine, the combination, with a rotating carrier having peripheral receptacles, of folding-strips arranged tangent or parallel to a tangent to the carrier and adapted to fold the last end flaps of the wrapper, and means for frictionally holding or retarding said flaps to strain the wrapper around the package, substantially as described.

24. In a wrapping-machine, the combination, with an intermittently-rotating carrier having peripheral receptacles, of folding-strips arranged tangent or parallel to a tangent to the carrier and adapted to fold the last end flaps of the wrapper, and guiding devices to hold said flaps upon said strips prior to such folding, substantially as described.

25. In a machine of the character described, the combination, with a rotating carrier having peripheral receptacles, of folding-strips arranged tangent or parallel to a tangent to the carrier to fold the last end flaps of the wrapper, guiding devices to hold said flaps in position upon said strips, and means for moving said guiding devices into and out of operative position, substantially as described.

26. In a machine of the character described, the combination, with a rotating carrier having peripheral receptacles, of folding-strips arranged tangent or parallel to a tangent to the carrier to fold the last end flaps of the wrapper, and retarding devices comprising blocks the surfaces whereof converge with those of the folding-strips, substantially as described.

27. In a wrapping-machine, the combination, with means for folding a wrapper around the sides and at the ends of a package, of means for applying to the folded ends adhesive seals or labels whereby the end folds of the wrapper are secured, substantially as described.

28. In a wrapping-machine, the combination, with means for folding a wrapper around the sides and at the ends of a package, of means for applying adhesive material to seals or labels and means for subsequently applying said seals or labels to the folded ends of the package, substantially as described.

29. In a wrapping-machine, the combination, with a rotating carrier having peripheral receptacles open at the sides, and means for folding a wrapper around a package in said receptacles and at the exposed ends thereof, of automatic mechanism for applying adhesive material to seals or labels and for applying said seals or labels to the folded exposed ends of the package and thus securing them, substantially as described.

30. In a wrapping-machine, the combination, with a rotating carrier having peripheral receptacles, and means for folding a wrapper around a package in said receptacles and at the exposed ends thereof, of seal or label hoppers located at the sides of the carrier, and suction-boxes adapted to move between the hoppers and the carrier to convey the seals or labels from the hoppers and to press them into position upon the ends of the package, substantially as described.

31. In a wrapping-machine, the combination, with a rotating carrier having peripheral receptacles open at the sides, and means for folding a wrapper around a package in said receptacles and at the exposed ends thereof, of hoppers located at the sides of the carrier, suction-boxes adapted to move between the hoppers and carriers and convey the labels from the hoppers and press them against the ends of the package, and paste-applying mechanism intermediate the hoppers and carrier whereby paste is applied to the labels in transit, substantially as described.

32. In a machine of the character described, a mechanism for feeding thin flexible labels of paper or the like, comprising a hopper having an open bottom and means for supporting the labels therein in combination with an oscillating suction-box having also movements radial to its axis of oscillation, and means for moving said suction-box radially to withdraw a label through the open end of the box, for swinging the box to carry the label to a position opposite the point of application and for moving the box radially to press the label upon the package, substantially as described.

33. In a machine of the character described, the combination with a hopper having an open bottom and supports projecting inwardly from the bottom to sustain the labels, of springs adapted to press against the edges of the pile of labels and a suction-box adapted to enter the open lower end of the hopper and remove the lowermost label therefrom, substantially as described.

34. In a machine of the character described, the combination with a hopper having an open bottom and means therein for supporting the pile of labels near its margin, of a suction-box having a surface substantially coextensive with the lower surface of the pile of labels and suction-apertures at its central portion interiorly of said marginal supports and means for entering and withdrawing the suction-box whereby to withdraw the labels from the hopper past the supports, substantially as described.

35. In a machine of the character described, the combination, with a carrier and a label-hopper located adjacent thereto, of a frame having a curved slot terminating in substantially vertical and horizontal portions extending respectively toward the hopper and carrier, and a suction-box engaging and traveling in a path determined by said slot, substantially as described.

36. In a machine of the character described, the combination, with a carrier and label-hopper, of a frame having a curved slot with vertical and horizontal extensions, a rocking sleeve-bearing mounted in said frame, a tube mounted to slide in said bearing, provided with a suction-box and having a projection to engage the slot, a vibrating arm, and a link connecting said vibrating arm with the tube, substantially as described.

37. In a machine of the character described, the combination, with an oscillating suction-box provided with a guard-finger, of a source of paste-supply, and a vibrating paste-applying roller provided with a guard-wheel to engage the guard-finger of the suction-box, substantially as described.

38. In a machine of the character described, the combination, with a carrier and a label-hopper, of a suction-box moving between the two, a source of paste-supply, vibrating arms provided with a paste-roller, and means for actuating said arm and alternately bringing said roller into contact with the paste-supply and with the moving suction-box, substantially as described.

39. In a wrapping-machine, the combination, with a rotating carrier having peripheral receptacles and folding-strips arranged tangent or parallel to a tangent to the carrier, means coöperating with said strips to strain the wrapper around the package, and a shoe for holding the packages in the receptacles during the operation of the folding-strips, substantially as described.

40. In a wrapping-machine, the combination, with a rotating carrier having peripheral receptacles open at their ends, of means for folding a wrapper around the sides and at the ends of a package in said receptacles, means for applying seals or labels to the exposed folded ends of said package, and fold-retaining guides located between the folding and labeling devices and adapted to hold the folded ends in position to receive the labels, substantially as described.

41. A wrapping-machine comprising means for folding a wrapper around the sides of a package and uniting the overlapped edges by paste or the like between them, means for folding the ends of the wrapper to cover the ends of the package, and means for applying to the folded ends seals or labels and securing them thereon by paste or the like, whereby the package is inclosed in a secured wrapper without contact between the paste or other securing adhesive material and the package, substantially as described.

42. In a wrapping-machine, the combination, with an intermittently-rotating carrier having peripheral receptacles, of end-folding devices, each comprising a radially-movable plate to fold the top flap, folding-blades pivotally mounted on said plate and provided with operating-rods, a fixed part through which said rods pass, and stops mounted on said rods outward and inward of said fixed part, substantially as described.

FRANK M. PETERS.
HENRY H. HUNGERFORD.

Witnesses:
   IRVINE MILLER,
   FREDERICK C. GOODWIN.